(12) United States Patent
Streibl

(10) Patent No.: US 11,199,558 B2
(45) Date of Patent: Dec. 14, 2021

(54) METHOD, COMPUTER PROGRAM PRODUCT, AND SYSTEM FOR ESTABLISHING A SAMPLE TUBE SET

(71) Applicant: BECKMAN COULTER, INC., Brea, CA (US)

(72) Inventor: Sebastian Streibl, Olching (DE)

(73) Assignee: Beckman Coulter, Inc., Brea, CA (US)

( * ) Notice: Subject to any disclaimer, the term of this patent is extended or adjusted under 35 U.S.C. 154(b) by 274 days.

(21) Appl. No.: 16/087,282

(22) PCT Filed: Mar. 3, 2017

(86) PCT No.: PCT/IB2017/000251
§ 371 (c)(1),
(2) Date: Sep. 21, 2018

(87) PCT Pub. No.: WO2017/163117
PCT Pub. Date: Sep. 28, 2017

(65) Prior Publication Data
US 2019/0128911 A1 May 2, 2019

(30) Foreign Application Priority Data
Mar. 22, 2016 (EP) .................................... 16000688

(51) Int. Cl.
*G01N 35/04* (2006.01)
*G01N 35/00* (2006.01)
(52) U.S. Cl.
CPC ....... *G01N 35/04* (2013.01); *G01N 35/00732* (2013.01); *G01N 2035/0493* (2013.01)
(58) Field of Classification Search
CPC .................. G01N 35/04; G01N 35/00732
See application file for complete search history.

(56) References Cited

U.S. PATENT DOCUMENTS

| 2004/0218804 A1* | 11/2004 | Affleck | ............... | G02B 21/0016 |
| | | | | 382/141 |
| 2010/0111767 A1* | 5/2010 | Yonekura | ............. | G01N 35/026 |
| | | | | 422/65 |

(Continued)

FOREIGN PATENT DOCUMENTS

| CN | 102109528 A | 6/2011 |
| CN | 103028452 A | 4/2013 |

(Continued)

OTHER PUBLICATIONS

International Search Report and Written Opinion dated Jun. 26, 2017 by the International Searching Authority (European Patent Office) in PCT Application PCT/IB2017/000251.

(Continued)

*Primary Examiner* — Matthew D Krcha
(74) *Attorney, Agent, or Firm* — Frost Brown Todd LLC

(57) ABSTRACT

A method of establishing a sample tube set which is adapted to be processed by a laboratory automation system. The method includes selecting a sample tube set comprising several sample tube types by selecting a plurality of different sample tube types from an assortment of available sample tube types; obtaining a parameter of distribution for at least one detection parameter of each sample tube type comprised in said sample tube set, wherein the parameter of distribution comprises information regarding a distribution of previously detected reference data values of the at least one detection parameter; determining whether the laboratory automation system is capable of correctly identifying each sample tube type comprised in said sample tube set by comparing the parameter of distribution for the at least one detection parameter of each sample tube type comprised in said sample tube set with the parameter of distribution for the at least one detection parameter of all the other sample tube types comprised in said sample tube set; and indicating that (Continued)

the selected sample tube set is approved for being processed by the laboratory automation system if it is determined that the laboratory automation system is capable of correctly identifying each sample tube type comprised in said sample tube set, or proposing at least one conflict remediation if it is determined that the laboratory automation system is not capable of correctly identifying each sample tube type comprised in said sample tube set.

16 Claims, 8 Drawing Sheets

(56) References Cited

U.S. PATENT DOCUMENTS

| | | | | |
|---|---|---|---|---|
| 2012/0178170 | A1* | 7/2012 | Van Praet | B01L 9/56 |
| | | | | 436/47 |
| 2012/0275885 | A1* | 11/2012 | Furrer | G01N 35/00732 |
| | | | | 414/222.02 |
| 2016/0018427 | A1 | 1/2016 | Streibl et al. | |

FOREIGN PATENT DOCUMENTS

| | | | |
|---|---|---|---|
| WO | 9928724 A1 | 6/1999 | |
| WO | WO-9928724 A1 * | 6/1999 | B65G 47/256 |

OTHER PUBLICATIONS

Extended European Search Report and Written Opinion dated Oct. 5, 2016 for Application No. 16000688.8, 8 pages.

Chinese Office Action dated Jul. 23, 2021 for Application No. 201780019850.8, 10, pages.

* cited by examiner

METHOD, COMPUTER PROGRAM PRODUCT, AND SYSTEM FOR ESTABLISHING A SAMPLE TUBE SET

TECHNICAL FIELD

The invention relates to a method, a system, and a computer program product for establishing a sample tube set.

BACKGROUND

The invention relates to a method, a system, and a computer program product for establishing a sample tube set.

In laboratory automation systems, e.g., the AutoMate 2500 series of Beckman Coulter Inc., a plurality of tubes containing samples may be analyzed and/or processed. In order to process and/or analyze the contents of the tubes in the laboratory automation system, also called automated lab system or LAS, a tube type needs to be recognized and/or identified to be correctly processed in the laboratory automation system. Multiple manufacturers produce different types of sample tubes. Sample tubes of different type may differ, e.g., in height, thickness, shape, etc. Since the sample tubes of different types comprise different physical properties, the sample tubes of different types might have to be handled differently in the laboratory automation system. For example, a gripping force applied to the tube may depend on the stability of the sample tube, and, thus, on the thickness of the glass and/or the diameter of the tube. Thus, not only a gripping force but also a uncapping and/or capping force applied to the tube, a filling height, and/or a centrifugal force might have to be considered by the laboratory automation system.

When establishing a sample tube set for a laboratory automation system, or when altering an existing sample tube set used in a laboratory automation system, a sample tube configuration/set has to be established and/or checked whether or not it is processable by the laboratory automation system. For example, in the AutoMate 2500 series, for each individual instrument installed in the laboratory automation system by a user, the tube configuration requires on site teaching for all the available tubes. Usually, a technician uses a confusion matrix to determine if a configuration of tubes is valid within reference samples, and then tests it on the individual instruments on site to verify an expected detection behavior of the sample tubes.

In other known laboratory automation systems, an approved list of sample tubes is published to be exclusively used for the laboratory automation system. Furthermore, information may be published about which sample tube types may be used or may not be used in the laboratory automation system.

However, problems may occur when configuring a sample tube set, by a user during instrument installation, set up, or servicing an instrument of a laboratory automation system, e.g. during a configuration change due to new sample tube types that need to be run on the system.

At a laboratory automation system site, technicians spend time on sample collection and reference data creation, on configuration of detection parameters and on conflict resolving until the laboratory automation system is properly configured and running stable. This process may take more than one day per instrument of the laboratory automation system. Also, the sample tube configuration might change frequently, e.g. when tubes need to be replaced or the laboratory automation system needs to expand. Each time this is the case, a technician has to go through an update process, risking running into problems which require help from higher support levels. This process of setting up a laboratory automation system is inefficient, not flexible and error prone.

In other words, a random tube set may lead to complex dependencies between tube characterization, e.g., tube type, volume and weight calculation, robot handling, and a variety of operations executed on the laboratory automation system, e.g. analyzing, uncapping, recapping, stacking, archiving, work flows and routing, cost optimization.

Thus, according to an aspect, a problem relates to improving establishment of a sample tube set which is adapted to be processed by a laboratory automation system.

SUMMARY

This problem is solved by the subject matter of the independent claims. Preferred embodiments are the subject-matter of the dependent claims.

A first aspect relates to a method of establishing a sample tube set which is adapted to be processed by a laboratory automation system, the method comprising the following steps:
  selecting a sample tube set comprising several sample tube types by selecting a plurality of different sample tubes types from an assortment of available sample tube types;
  obtaining a parameter of distribution for at least one detection parameter of each sample tube type comprised in said sample tube set, wherein the parameter of distribution comprises information regarding a distribution of previously detected reference data values of the at least one detection parameter;
  determining whether or not the laboratory automation system is capable of correctly identifying each sample tube type comprised in said sample tube set by comparing the parameter of distribution for the at least one detection parameter of each sample tube type comprised in said sample tube set with the parameter of distribution for the at least one detection parameter of all the other sample tube types comprised in said sample tube set; and
  indicating that the selected sample tube set is approved for being processed by the laboratory automation system, if it is determined that the laboratory automation system is capable of correctly identifying each sample tube type comprised in said sample tube set, or
  proposing at least one conflict remediation, if it is determined that the laboratory automation system is not capable of correctly identifying each sample tube type comprised in said sample tube set.

The method is used to establish a sample tube set. Each sample tube set comprises several sample tubes having several sample tube types. Each sample tube type may correspond to a specific type of sample tube, e.g. produced by a specific manufacturer, combined with a specific cap type, e.g. produced by a specific manufacturer, further combined with a specific color, e.g. at least one specific value. Each sample tube type may have different characteristics like a specific height, shape, cap, color of a cap, etc.

The sample tube set consists of several sample tubes having several such sample tube types, e.g. from 2 to 100 sample tube types, preferably from 2 to 50 sample tube types.

The LAS should be adapted to process all (sample) tubes of the sample tube types of the established sample tube set.

The present description refers to analyzing one or more (sample) tubes in the LAS, thereby identifying, detecting, and/or distinguishing the sample tube type of the analyzed (sample) tube. In other words, (sample) tubes processed in the LAS may be classified as being associated with a specific sample tube type of the sample tube set. In the interest of conciseness, the present description refers to identifying, detecting, and/or distinguishing sample tube types. It should be understood that this language refers to identifying, detecting, and/or distinguishing sample tubes of the sample tube types.

The available sample tube types may correspond to all sample tube types available on a local market, in particular at a LAS. The available sample tube types may also correspond to all sample tube types available at a laboratory automation system. The selected sample tube set may depend on the laboratory automation system in which the sample tube set is supposed to be processed. The sample tube set may be configured for a specific processing routine within the laboratory automation system or maybe configured for any possible workflow within the laboratory automation system.

The laboratory automation system may be any automatic laboratory system that enables automatic processing and/or analyzing of sample tubes that may contain samples of, e.g., fluids like urine, whole blood, serum, plasma, gel, or the like. After selecting the sample tube set, which may also be called sample tube configuration or tube configuration, a parameter of distribution for at least one detection parameter of sample tubes of each sample tube type of the sample tube set is obtained.

Therein, the detection parameter may for example be the height of the sample tube of the sample tube type with or without the cap, a color of a cap of the sample tube type, the shape of the sample tube type, a color value, a number of detectable colors, a color distribution, a light transmission pattern, a light reflection pattern, a presence of a thread, an inner and outer tube diameter, and so on.

While a manufacturer of the sample tubes of the sample tube type may publish a specific value of the detection parameter, e.g. a height of 10 cm, the sample tubes of said sample tube type may not all exactly comprise said detection parameter. For example, the actual height of the sample tubes might be distributed, more specifically, the actual height values might vary from 9.7 to 10.4 cm. Thus, the parameter of distribution might include an average value, a mean value, and/or a deviation like a standard deviation relating to the actual values of the sample tubes of the sample tube type. Thus, the parameter of distribution might include a mathematical formulation of the distribution of the detection parameter of the sample tube types.

Preferably, a plurality of such detection parameters is selected and a respective plurality of corresponding parameters of distribution is obtained for each sample tube type of the sample tube set. However, in case a single parameter of distribution for a single detection parameter is sufficient to distinguish all sample tube types contained in the sample tube set, only such a single detection parameter may be selected.

As explained above, the parameter of distribution comprises information regarding the distribution of previously detected reference data values of the at least one detection parameter. In other words, a number of samples of one of the sample tube types was previously investigated and/or measured. For example, the height as detection parameter might have been measured previously. Results of these previous measurements might be stored as reference data values that are used to establish the parameter of distribution for said detection parameter.

A step of obtaining the parameter of distribution might include accessing a master tube data base containing reference data values and/or parameters of distribution for a plurality of different sample tube types.

After the parameter of distribution of each sample tube type of the sample tube set is obtained, it is determined whether or not the laboratory automation system (short: LAS) is capable of correctly identifying sample tubes of each sample tube type of the sample tube set. For this determination, information about the LAS may be required and also a comparison of the parameter of distribution for the at least one detection parameter.

The LAS may be able to distinguish sample tubes of the sample tube types by identifying all of them correctly. The laboratory automation system might comprise a sensor system. The sensor system may comprise one or more sensors like digital cameras, in particular CCD cameras, that may be used to establish image information of a sample tube within the LAS. The number and type of sensors available in the LAS are dependent on the specific LAS. In the example referred to above, a sensor might measure the height of a sample tube held within the LAS. The measured height might be compared to the parameters of distribution obtained previously. By comparing the parameters of distribution with each other, it may be calculated whether or not the LAS will be able to identify the different sample tube types of the sample tube set. For this identification, a plurality of different detection parameters might have to be selected and evaluated.

It may be established that the LAS is capable of correctly identifying each sample tube type of the sample tube set if there exists at least one detection parameter for each sample tube type that can be distinguished from all the other sample tube types of the sample tube set.

Since sample tubes of the same sample tubes type may comprise different values of the same detection parameter, e.g. because the actual attribute or characteristic of each tube is distributed, the determination may not be absolute but may involve establishing a probability, e.g. a predetermined probability of whether or not the LAS will be able to identify all sample tube types of the sample tube set. For example, whenever it is established that the LAS will likely identify at least 95%, preferably 99%, more preferably 99.9% of all the sample tubes types correctly, it may be determined that the LAS is sufficiently capable of correctly identifying the sample tube types.

Depending on the previous determination, it is indicated that the selected sample tube set is approved for being processed by the laboratory system if it is determined that the laboratory automation system is capable, e.g. sufficiently capable, of correctly identifying each sample tube type. The indication may be given acoustically and/or optically. In particular, the indication may be given in form of a written message.

However, if it is determined that the laboratory automation system is not capable of correctly identifying each sample tube type comprised in said sample tube set, at least one conflict remediation is proposed. This proposal including a solution for the conflict may be established automatically. There exist multiple different possibilities for providing a conflict remediation. Specific embodiments of conflict solutions and/or remediations are given below.

During the step of determining whether or not the LAS is capable of correctly identifying each sample tube type, it may be established whether or not a so-called conflict exists for identifying two different sample tube types of the sample tube set. When, e.g., the parameters of distribution for two different sample tube types overlap for one detection parameter, using said detection parameter might not be sufficient to distinguish the two sample tube types. Thus, overlapping distributions for detection parameters might lead to a conflict, also called an identification conflict.

In case all distributions of all available detection parameters of two sample tube types overlap to a certain degree, the LAS may run into a conflict when trying to identify a sample tube of the tube configuration. Identifying a sample tube means taking a sample tube of the sample tube set and associating this sample tube with the sample tube type it belongs to. If the LAS is not able to distinguish between two sample tube types of the sample tube set, it may be indicated that such a conflict occurs.

However, according to the method of the first aspect, additionally a possible conflict remediation is offered to a user who may choose to proceed with said conflict remediation or to reject the proposed conflict remediation. In case the user rejects the conflict remediation, another conflict remediation may be proposed until a conflict-free sample tube set is established. The steps of the method may be repeated until all conflicts are solved and, thus, a sample tube set is established that is adapted to be processed in the laboratory automation system.

A successful classification of all sample tube types of the sample tube set may be accomplished if all detected values of the selected detection parameters of the sample tube types are within decision thresholds that are based on the parameters of distribution.

The method improves establishment of a sample tube set for a LAS. In particular, it saves time and, thus, costs to establish the sample tube set. It is, in particular, advantageous that parameters of distribution may be obtained quickly from a data base instead of running tests and obtaining reference data values at each instrument of the LAS. Thus, the time needed to establish the sample tube set is reduced.

The conflict remediation may be adapted to solve a single conflict between two sample tube types and/or it may be adapted to solve all conflicts between all sample tube types of the sample tube set.

According to an embodiment, proposing the at least one conflict remediation comprises:
outputting information regarding conflicting sample tube types that cause an identification conflict during the comparison, and
asking a user if these conflicting sample tube types have to be distinguished by the laboratory automation system.

While in general the sample tube types of the sample tube set should be identified for an optimized workflow within the LAS, the operation within the LAS may work stable even without identifying all of the different sample tube types. According to this embodiment, the (for example two) sample tube types that cause the identification conflict are output, or at least information regarding these conflicting sample tube types. A user may decide whether or not these sample tube types that cause the identification conflict have to be distinguished and/or distinguished by the LAS. Indeed, in some laboratory automation systems, not all sample tube types need to be identified. For example, sample tubes of two different sample tube types may be handled and/or processed similarly or equally.

However, according to this embodiment, the user has control over the decision whether or not said sample tube type has to be distinguished or not. This decision is not made automatically, but manually. However, most or all of the other steps of the method may be executed automatically, e.g. by use of a computer program product and/or a processor.

According to a further development of this embodiment, if the conflicting sample tube types need to be distinguished, it is proposed as the at least one conflict remediation to remove or replace a sample tube type from said sample tube set, and/or to adjust at least one parameter of distribution for the comparison of the parameters of distribution. This embodiment relates to the alternative that the sample tube types that cause the identification conflict have to be distinguished. This decision to distinguish said sample tube types may be input at according input means by the user. Since the sample tube types need to be distinguished from each other, one possible solution for the conflict may be to remove or replace one of these sample tube types that cause the identification conflict from the sample tube set. Removing one of those sample tube types would mean to simply not use said sample tube type in the LAS. However, said sample tube type could also be replaced. This could include amending one sample tube type, for example using a different cap color for the sample tube type, using a sample tube type from a different manufacturer or the like. Thus, replacing a sample tube type may include amending one sample tube type from one configuration into another configuration.

Thus, instead of using the sample tube type that caused the identification conflict, another sample tube type could be used in the sample tube set. After replacing the sample tube type and/or after removing a sample tube type, the method can be run again to check the amended sample tube set for further conflicts.

While removing or replacing a sample tube type may be used as the conflict remediation, another way to solve the conflict may be to adjust at least one parameter of distribution for the comparison of the parameters of distribution. This is in particular useful in case the parameters of distribution of two sample tube types overlap only slightly. Thus, most sample tubes of the sample tube types that cause the identification conflict will probably be distinguished anyway. In case the expected error is acceptable, e.g. lower or equal to a maximum error value, e.g. a maximum error value of 5%, preferably 1% more preferably 0.1%, the parameter of distribution is adjusted to accept said error. Thus, another conflict remediation may be to solve the identification conflict by adjusting at least one parameter of distribution.

In this embodiment, if the conflicting sample tube types need not be distinguished, it may be proposed as the at least one conflict remediation to define at least two of the conflicting sample tube types as an alias tube type for said sample tube set. Then, the method further comprises checking for potential processing conflicts of the alias tube type when the conflicting sample tube types comprised in the alias tube type are processed in the laboratory automation system, and resolving said processing conflicts by establishing processing parameters suitable for processing all conflicting sample tube types comprised in the alias tube type. If the user decides that the sample tube types causing the identification conflict do not have to be distinguished, this decision is input into a system on which a method is running and/or executed. In this case, the at least two conflicting sample tube types, namely the sample tube types that cause the identification conflict, are merged into an alias tube type. The alias tube types comprise at least the two or more sample tube types that caused an identification conflict. Thus, the original identification conflict is solved by simply not discriminating between (or not distinguishing) the conflicting sample tube types. Thus, all sample tubes of the conflicting sample tube types merged in the alias tube type will not be distinguished in the LAS and will be handled similarly and/or identically in the LAS.

However, even when the conflicting sample tube types are merged in the alias tube type, further conflicts may occur in the LAS. Thus, it may be checked again whether identification conflicts may occur based on a sample tube set that includes the established alias tube type. It is furthermore checked whether or not an identification conflict may occur when all sample tube types of the alias tube type are processed identically in the LAS. In this embodiment, the sample tube set may comprise not only one alias tube type but a plurality of alias tube types.

In a further step, the processing conflicts occurring when processing all conflicting sample tube types comprised in the alias tube type may be resolved. The resolving of these so-called second level conflicts, i.e. conflicts involving at least one alias tube type, may include establishing adjusted processing parameters. For example, in case two sample tube types are comprised in the alias tube type, a gripping force applied by a gripper of the LAS may be set to a mean value between the preferred gripping force value of all of the sample tube types contained in the alias tube type. Alternatively, only one of the different parameters of distribution may be used for the alias tube type instead of such a mean value.

In this invention, identification conflicts between sample tube types of the sample tube set are referred to as first level conflicts. Identification and/or processing conflicts involving at least one alias tube type of the sample tube set are referred to as second level conflicts. The alias tube type may also be referred to as alias ID or as a merged, consolidated, and/or combined tube type.

In this embodiment, the conflicting sample tube types comprised in the alias tube type may be removed from said sample tube set and the alias tube type may be added to said sample tube set. In practice, an alias tube type, also called alias ID, may be defined by selecting one of the conflicting sample tube types out of the group of conflicting sample tube types. However, the alias tube type may also be established by establishing a sample tube type comprising attributes of the different conflicting sample tube types contained in the alias tube type. However, also the one "selected" sample tube type may be further used and/or processed in the LAS as the alias tube type. Thus, the LAS will not try to distinguish between the conflicting sample tube types of the alias tube type, but will simply identify all tubes of these conflicting sample tube types as relating to the one alias tube type.

According to an embodiment, said sample tube set is selected by modifying a predetermined sample tube set by removing and/or adding a sample tube type and/or an alias tube type from and/or to the predetermined sample tube set. This embodiment relates to an already established and/or installed LAS. Over time, an already established, predetermined sample tube set may have to be adjusted because a workflow in the LAS may have been adjusted and/or new and/or further tubes are needed in the LAS. The method may also be used to alter the predetermined sample tube set accordingly and check the altered sample tube set for conflicts. Thus, the new sample tube set is established based on the predetermined and/or preexisting sample tube set.

According to an embodiment, the parameter of distribution for the at least one detection parameter of each sample tube type of said sample tube set is obtained as a reference classification data from a data base, wherein the reference classification data comprises information regarding a plurality of previously detected reference data values of the at least one detection parameter. The data base may be provided as a master tube data base, which contains the reference classification data. The reference classification data may, for example, contain the plurality of previously detected reference data values. The reference classification data comprises information about sample tubes of the corresponding sample tube type that were measured and or detected to establish the data base. Thus, the parameter of distribution does not have to be established in the actual LAS, but may be based on information measured and stored in the data base. The access to the data base, in particular the sending of the reference classification data from the data base to the LAS may occur online over the World Wide Web. Thus, reference classification data for the sample tube types of the sample tube set is obtained from the data base. This process saves time when compared to establishing the parameter of distribution manually at the LAS and, in particular, every time anew when the sample tube set is amended. The reference classification data may be obtained using a calibrated (and, in particular, quality controlled) measurement system corresponding to an instrument of the LAS, e.g. a camera, a detection device, and/or a sensor, used to record one or more reference images of the sample tube type.

In this embodiment, the reference classification data may be obtained by detecting the at least one detection parameter in multiple reference measurements of reference sample tubes of the same sample tube type, in particular wherein for the multiple reference measurements a sensor calibration is applied that is also applicable in the laboratory automation system. The reference classification data is based on multiple reference measurements, e.g. for each detection parameter on at least 100, preferably 1000, more preferably at least 5000 reference measurements. The reference measurements may have been executed under the same conditions as they will be executed in the LAS for which the sample tube set is established. Thus, the reference classification data may reflect these actual system conditions of the LAS. This may be implemented by using the same sensor, in particular the same camera running with the same software as in the LAS and in a system that is used to carry out the reference measurements. The sensor may also be calibrated in an identical process. Thus, the reference classification data in the data base may as close to the relevant system conditions in the LAS as possible.

According to an embodiment, each sample tube type comprises a plurality of detection parameters, wherein each detection parameter is
- a detectable property of a sample tube of the sample tube type,
- a detectable property of a sample cap of the sample tube type,
- a detectable property of a combination of a sample tube and a sample tube cap, and/or
- a detectable property related to a color of the sample tube type.

A detectable property of the sample tube may, e.g. relate to a dimension of the sample tube, like height, inner diameter, outer diameter, volume, shape, and the like. A detectable property of a sample cap of the sample tube type may relate to the sample cap used to cap the sample tube. The according detectable property of the sample cap may relate to a sample tube cap dimension, a sample tube cap shape, and the like. However, instead and/or additionally to relating to properties of either the sample tube or the sample tube cap, the detection parameter might relate to a detectable property of a combination of those two, in particular the shape and/or height of a capped sample tube. In particular, the detection parameter might relate to a detectable property of a color of the sample tube type. This could, e.g., be a color of the cap and might include a positioning information at the cap of the sample tube cap. Since most sample tubes are transparent, the color will most likely be detected at the sample tube cap. However, also at least partially covered sample tubes may be used in the sample tube set. All these detectable properties may be detected by a camera as a sensor to detect a detection value that may be compared with the parameter of distribution of the according detection parameter.

According to an embodiment, the at least one detection parameter is selected from one of the following parameters:
a sample tube cap dimension,
sample tube cap shape,
a sample tube cap color,
a sample tube cap color pattern,
a sample tube dimension,
a sample tube shape,
an object and/or substance comprised within a sample tube,
a number of detectable colors,
a dimension of a combination of a sample tube and a sample tube cap,
a shape of a combination of a sample tube and a sample tube cap,
a color of a combination of a sample tube and a sample tube cap, and
an object and/or substance comprised within a combination of a sample tube and a sample tube cap.

As described above, also a plurality of the detection parameters as listed above may be chosen as detection parameters. Preferably, only as many detection parameters are chosen as are necessary to distinguish the sample tube types. Thus, the process of comparison can be executed fast and efficiently in the LAS. However, to increase the accuracy of the detection of all the sample tube types, more detection parameters than necessary may be chosen to enable checking the identity of an already identified sample tube type. Examples of specific detection parameters may be e.g. a cap diameter of 13 mm, a tube length of 80 mm, a red cap color, a tube inner diameter, a tube outer diameter, a gel layer, a tube bottom shape, a tube cap color pattern, the shape of a sample meniscus, etc.

According to an embodiment, the method further comprises the steps:
obtaining, in particular from a data base, workflow data for each sample tube type comprised in said sample tube set, wherein
the workflow data is related to at least one detection parameter of each sample tube type comprised in said sample tube set, and
the workflow data contains information regarding how each sample tube type comprised in said sample tube set is processed in at least one processing step of a workflow of the laboratory automation system; and
determining, based on the obtained workflow data, whether the laboratory automation system is capable of correctly performing the at least one processing step of said workflow for each sample tube type comprised in said sample tube set.

The workflow data may relate to a gripping force applicable to one specific sample tube type, or an applicable centrifugal force, rotations per minute, a filling volume, etc. The workflow data may be relied upon by the LAS when performing the corresponding processing step. For example, the LAS may check workflow data relating to a gripping force and a filling volume before a robot grips a sample tube of a specific sample tube type and fills said sample tube with a medium, such as a fluid.

According to this embodiment, it is determined whether or not the LAS is capable of correctly performing the processing steps of the planned workflow. For example, when a sensor is included in a robotic arm of the LAS that is used to grab and hold a sample tube, the applicable gripping force has to be known before the robotic gripper applies said gripping force to the sample tube. Thus, in case the sample tube is provided in a rack, it might not be possible for the sensor to detect the height of the sample tube, or the height of the sample tube together with a sample tube cap, before lifting the sample tube from the rack. Hence, it can be checked whether or not the sensor and the gripper may identify the sample tube type from other detection parameters, e.g. the color and/or shape of the sample tube cap, before gripping and lifting the sample tube out of the rack. It can further be checked whether or not it is necessary to identify the sample tube type before lifting it out of the rack, or whether or not the sample tube types of the sample tube set may be operated at a similar or the same gripping force. Then, in the following workflow step, namely after lifting the sample tube out of the rack, the sensor may also detect the height of the sample tube and/or the capped sample tube to fully identify the sample tube type before filling the sample tube with a sample. Thus, in this embodiment, a scheduling may be incorporated when and at which processing step in the workflow the sample tube types are all identified.

According to an embodiment, at least one processing step of a workflow relates to
detecting a tube of the sample tube type by a sensor,
centrifuging a tube of the sample tube type;
gripping of a tube of the sample tube type in a pick and place operation;
uncapping and/or recapping of a tube of a sample tube type;
aliquotation of sample liquid into secondary tubes;
transporting a tube of the sample tube type on a track system, in particular switching of lanes in the track system;
analyzing a sample contained in a tube of the sample tube type;
storing a tube of the sample tube type; and/or
removing a tube of the sample tube type from the laboratory automation system.

The listed examples relate to processing steps for which workflow data may be required. For example, before centrifuging a tube, the applicable centrifugal force and/or the applicable rotations per minute may have to be known. Similarly, a gripping force, a capping force, or uncapping force, or a filling volume of the selected tube may be provided as workflow data. For analyzing a sample, the transparency of the glass of the tube may be obtained as workflow data. For storing a tube, the outer diameter or the height or a similar dimension might be relied upon as corresponding workflow data. Workflow data may also relate to mixing the contents of a tube with a reagent, physical and/or optical analysis, etc.

In a further development of the embodiment, the workflow data contains information regarding:
- a geometry, in particular a conicity, of an inner diameter of the sample tube type,
- an empty tube weight of the sample tube type,
- a cap weight of the sample tube type,
- at least one safety parameter of the sample tube type, in particular a maximum filling level for safety capping of the sample tube type and/or a maximum acceleration speed on track of the sample tube type,
- an analyzer specific tube ID of the sample tube type,
- a manufacturer article and/or ordering number of the sample tube type,
- a material, additive and/or feature to be expected with the sample tube type, and/or
- an effective tube height of the sample tube type, dependent on the outer tube shape and the tube placement position of the sample tube type within the laboratory automation system.

The tube and/or the sample tube cap may be provided with an ID, such as a bar code or an RFID tag, that may be detected by a sensor of the LAS. Said identification may be used as an analyzer specific tube ID or as an analyzer specific ID, as a manufactory article number, as an ordering number or the like. The analyzer specific ID may relate to tube types known to an analyzer of the LAS.

Workflow data containing information about the effective tube height of the sample tube type, may depend on the outer tube shape and the tube placement position of the sample tube type within the laboratory automation system. Based on such workflow data, e.g. a precise gripping position for a sample tube type may be calculated. Tube placement positions may be any cavity adapted for receiving a sample tube, e.g. a sample tube rack cavity within the input area, a sample tube placement position within a centrifuge module, a tube carrier recess on a conveyor belt or a storage rack cavity within the lab automation system. Due to the interaction between the respective tube receiving cavity at each of the different placement positions and the outer tube shape, especially the tube bottom shape, the effective tube height of each tube type may be different for each of the different placement positions. The effective tube height information may be used for processing a sample tube, for example when gripping a sample tube with a robotic gripper. In another embodiment, the effective tube height may be used to evaluate whether it is possible to place a sample tube rack, equipped with one or more defined sample tube types, at a certain location with height limitations, e.g. into a narrow slot within a sample tube storage location.

According to an embodiment, the parameter of distribution comprises information regarding a mean value, a standard deviation, a stability of shapes, and/or a maximum color value spread of the detection parameter. The parameter of distribution generally depends on the detection parameter. Thus, the parameter of distribution for a color value might be different than the parameter of distribution for a dimension and/or location at the tube. However, each parameter of distribution is related to one detection parameter. Also, the parameter of distribution is configured to be compared with a detection value of the corresponding detection parameter that may be detected by a sensor of the LAS. Thus, the parameter of distribution allows the establishment of a probability of whether or not a detected value corresponds to the detection parameter of a predetermined sample tube type.

According to an embodiment, the comparing of the parameters of distribution comprises determining a detection parameter probability value for correctly identifying the sample tube type based on the parameter of distribution for the detection parameter. In other words, whenever the LAS senses a detection value for the detection parameter of one of the tubes of the sample tubes set, a detection parameter probability value may be calculated containing information about whether or not the selected tube, namely the tube from which the detection value was sensed, may be identified as one of the different sample tube types of the sample tube set. In case the sample tube set also contains alias tube types, the probability may also relate to whether or not the selected tube may be categorized as an or one of the alias tube types.

According to an embodiment, a probability is calculated that at least one sensor of the laboratory automation system can distinguish at least one detection parameter of each sample tube type from at least one detection parameter of each of the other sample tube types comprised in said sample tube set. This condition may be sufficient to distinguish all of the sample tube types (and/or alias tube types) of the sample tube set.

According to an embodiment, a neural network is used to identify the sample tube types comprised in said sample tube set. The neural network may be installed on a processor, e.g. a computer processor, to automatically detect and/or identify the sample tube type of any tube used in the LAS. A neural network is very efficient in running detection algorithms, and in correlating a tube to a corresponding sample tube type. The neural network may be implemented as a computer program product and/or a computer application.

A second aspect relates to a computer program product comprising computer readable instructions, which, when loaded and executed on a computer system, cause the computer system to perform operations according to the method of the first aspect. The computer system may be part of the LAS or may be connected to the LAS. The computer system may be a laptop or other portable, mobile computer device. In particular, the computer program product may be adapted to cause the computer system to calculate identification probabilities and to store parameters of distribution and/or work flow data in the LAS. The computer program product may be adapted to connect the LAS to a master tube data base containing a plurality of data reference values and workflow data of the instruments of the LAS.

A third aspect relates to a system for establishing a sample tube set which is adapted to be processed by a laboratory automation system, the system comprising:
- a selecting means for selecting a sample tube set comprising several sample tube types by selecting a plurality of different sample tube types from an assortment of available sample tube types;
- a parameter means for obtaining a parameter of distribution for at least one detection parameter of each sample tube type comprised in said sample tube set, wherein the parameter of distribution comprises information regarding a distribution of previously detected reference data values of the detection parameter;
- a determination means for determining whether or not the laboratory automation system is capable of correctly identifying each sample tube type comprised in said sample tube set by comparing the parameter of distribution for the at least one detection parameter of each sample tube type comprised in said sample tube set with the parameter of distribution for the at least one detection parameter of all the other sample tube types comprised in said sample tube set; and an indicator means configured to:
indicate that the selected sample tube set is approved for being processed by the laboratory automation system, if the determination means determined that the laboratory automation system is capable of correctly identifying each sample tube type comprised in said sample tube set; and/or
propose at least one conflict remediation, if the determination means determined that the laboratory automation system is not capable of correctly identifying each sample tube type comprised in said sample tube set.

The selecting means, the parameter means, the determination means, and the indicator means may be implemented as selecting means, parameter means, determination means, and indicator means, respectively. Said means may be implemented as (sub-)routines of a computer program product. The system according to the third aspect may be implemented as a system on which the method according to the first aspect may be executed. Thus, all explanations and embodiments referred to in regard with the method according to the first aspect also apply to the system according the third aspect and vice versa. The selecting means may require an input from a user that selects sample tube types for the sample tube set to be established. The parameter means may be implemented as a full automatic means that obtains the parameter of distribution from a master tube data base, e.g. over the World Wide Web.

The determination means may be adapted to calculate a probability of whether or not the LAS will be able to identify all sample tube types of the sample tube set. The indicator means may comprise a screen on which the indication and/or the proposal are shown, e.g. in a written form.

BRIEF DESCRIPTION OF DRAWINGS

Embodiments of the invention are described in reference to the figures. The features of these embodiments may be implemented in other embodiments. Identical reference signs used in the figures may relate to similar and/or identical features of the embodiments. A brief description of the figures follows.

DETAILED DESCRIPTION

Figure 1:
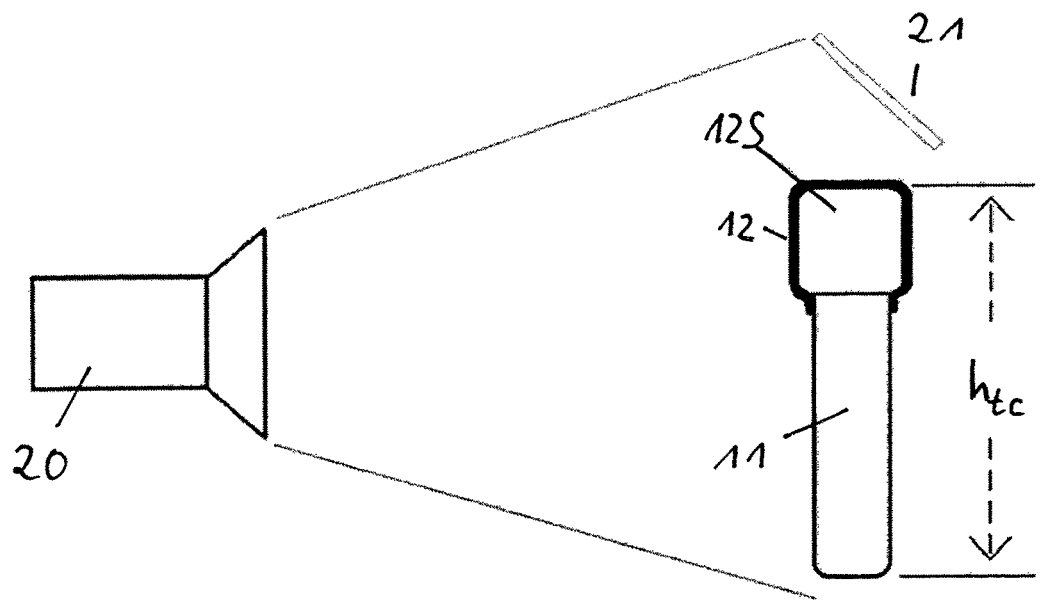
FIG. 1 is a schematic drawing of a sensor of a LAS together with a capped sample tube.

When establishing a sample tube set for a laboratory automation system (abbreviated as LAS), often a confirmation of the usable tubes is based on experience and knowledge of the involved individual persons. A difficult part of estimating the ability of the LAS to process a tube, or even all tubes of the sample tube set, is to decide whether properties of the tubes of the sample tube set, like color or shape characteristics, would cause a detection conflict and/or identification conflict or not. For establishing a sample tube set, knowledge of the instruments of the laboratory automation system, for example machine vision and detection software, is required to confirm whether or not the LAS will run into a conflict. The method of establishing a sample tube set may depend on a color segmentation algorithm, choosing a representative color area of a sample tube cap, creating an average value from a region of interest, detecting characteristics such as height, width, cap shapes, bottom shapes, etc.

The method according to the invention may include decisions involving some or all of the characteristics of sample tube types, including a combination of the characteristics and their inner dependencies. Preferably, the method enables establishment of the sample tube set automatically. The method may help to confirm the compatibility of the sample tube set with a specific laboratory automation system. The LAS may comprise a plurality of instruments that grip, analyze, centrifuge, transport, cap, uncap, fill, and/or empty sample tubes from the sample tube set being processed in the LAS.

The LAS will comprise at least one sensor, for example a camera device, an infrared measurement device, and/or a weight detection system. Furthermore, the LAS may be equipped with further devices such as mirrors, retroreflective materials, light absorbers, etc. Thus, the LAS will comprise a detection system comprising said elements that is used to identify the tubes of the sample tube set in the LAS. The method according to the invention establishes whether or not the LAS is capable of characterizing and/or identifying all or a sufficient number of sample tubes of the sample tube set. Usually, sensor devices such as images and infrared measurement devices generate data and align the data to a time space or a multidimensional array. In an exemplary camera, each pixel carries color information and a relative orientation in a grid, e.g. an absolute position within a defined grid. Therein, the color information is relative, and may obtain an absolute meaning when set in relation to a reference color. The same may be applied to pixel coordinates. Pixel coordinates of the camera may be mapped to a relative distance from a defined origin. For both the color and the pixel coordinates, a defined reference may be used. For example, the pixel information may be transferred into metric dimensions. Therein, a calibration tool with defined metric distances in required dimensions may be used to generate a map or anchor points, e.g. by interpolation between the anchor points, to calculate a metric value corresponding to the pixel coordinate. This approach may be used to correct lens distortion of a lens of the camera of the LAS. Similarly, the color of each pixel may be calibrated with respect to a defined color reference or a set of defined color references.

A sensor device may be calibrated at the production site of the sensor device or when the sensor device is integrated into the LAS. If the sensor device is combined with a robot system, the area requirements of the position accuracy and repeatability of positioning the involved axis do not contribute significantly to the overall measurement distribution. For example, if the robot shows an inaccuracy of ±0.1 mm, the sensor device is able to resolve differences of ±1.0 mm, a possible maximum deviation from a calculated robot position would seem acceptable and might not impact the measurement at the calibration position.

Involved parts may be quality controlled (QC) within predetermined specifications. This may be applied to all visible components in the field of view of the sensor device of the LAS, e.g. robotic parts, covers, reflective parts, mirrors. The field of view of the sensor device may be split into separate regions of interest and may be analyzed using predetermined criteria like average light intensity value, gradient of light intensities, or being within a specified statistical distribution of light intensities. It is also possible to analyze visible parts before integration with calibrated spectral color analyzers.

Preferably, a sensor device like a camera also meets predetermined color measurement characteristics. Quality control of the sensor device may be done in a way similar to a light intensity check, i.e. by placing a color reference object in front of the sensor device. The color values may be dependent on the sensor device, the electronic amplification, the illumination, the lens, and on the object. It may be sufficient to perform a QC at the installed LAS, when a stable color reference object is used for the QC. Any instrument of the LAS may potentially cause the QC to fail, which is why the test and acceptance criteria may cover a complete dynamic range of result values to ensure that the behavior of the sensor device is controlled. If all criteria of the QC are met, the sensor device may pass the QC successfully.

In other words, the method may include a quality control of its sensor devices. Also, the sensor devices used to establish the parameters of distribution may be quality controlled.

The LAS for which the sample tube set is established may comprise a detection system comprising multiple different sensor devices. One of these sensor devices may be provided with/arranged as a camera that is arranged with a field of view suitable to extract characteristic features of a tube in the LAS.

FIG. 1 shows in a schematic drawing a camera 20 as sensor of a LAS. The field of view of the camera 20 is directed towards a sample tube 11. The sample tube 11 is provided with a sample tube cap 12 and, thus, is provided as a capped sample tube. The camera 20 is configured to create image data of the capped sample tube 11. The image date may include a height $h_{tc}$ of the capped sample tube. The image data of the camera 20 may also include one or more of the following: a shape of the sample tube 11, a shape of the sample tube cap 12 when viewed from the direction of the camera 20, the color of the sample tube cap 12.

A mirror 21 of the LAS may be configured to include image data from a side 12s of the sample tube cap into the field of view. Thus, the image data may also comprise data from different sides of the sample tube 11 and, in particular, from different sides of the sample tube cap 12. Each sensor device, like the camera 20 of the LAS, may be provided with one or more such mirrors 21.

The LAS may, thus, comprise mirrors that enlarge the field of view of a sensor of the LAS.

The LAS may be controlled so that the image data generated by the camera 20 when the sample tube 11 is at a predetermined distance and at a predetermined orientation with respect to the camera 20. The height of the sample tube may also be measured when the sample tube 11 is capped and uncapped.

Features that may be extracted relate to the tube height, the cap shape, and the side and/or top colors of the sample tube cap 12. The mirror 21 may be used to extract the color at the top of the sample tube cap 12.

Figure 2:
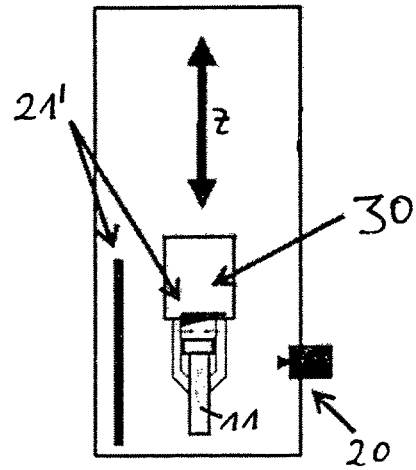
FIG. 2 is a schematic drawing of a gripper of a LAS holding a sample tube.
Figure 3:
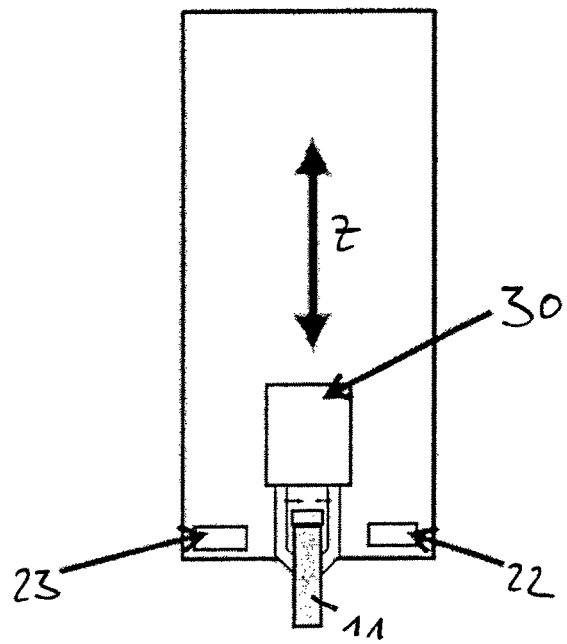
FIG. 3 is a schematic drawing of a gripper of another a LAS holding a sample tube.

FIG. 2 and FIG. 3 show in schematic drawings a gripper 30 of a LAS holding a sample tube 11. In FIG. 2, a camera 20 is provided to generate image data of the sample tube 11 held by the gripper 30. Two mirrors 21 are arranged so that the image data will include an image of the backside of the sample tube 11 and an image of the top side of the sample tube 11. For this, the instrument of the LAS will comprise a back mirror and a top mirror to generate the corresponding image data.

The gripper 30 may be configured to move in a z-direction, namely an upwards and/or downwards direction in the reference system of the earth.

FIG. 3 shows another gripper 30 holding a sample tube 11. Therein, an LLD detector is arranged at a first side of the sample tube 11 when held in a specific position by the gripper 30. The LLD detector 22 is configured to detect a liquid level within the sample tube 11.

On an opposite side of the sample tube 11 when held in said specific position, an LLD light source is arranged to illuminate an upper portion of the sample tube 11, wherein, presumably, the liquid level within the sample tube 11 will be arranged.

The abbreviation LLD is short for "liquid level detection". The LLD light source 23 will emit light rays that propagate through the sample tube 11 towards the LLD detector 22 that may be provided as photodetector and/or camera. Since the sample tube 11 is held by the gripper 30 in a predetermined position, a fill level, namely the liquid level within the sample tube 11, may be extracted from the image data provided by the LLD detector 22. The LLD detector 22 may also be configured as a line camera or infrared device used to determine fill levels. Further, the LLD detector 22 may be used to provide characteristics like the tube height and/or the cap height of the sample tube 11.

In the method, parameters of distribution are obtained. In particular, they may be obtained from a master tube data base, abbreviated as MTDB. The MTDB may contain tables for tubes, caps, colors, and manufacturers. Any tube type may be combined with a sample tube cap, which generates another table and/or another type. An element of a tubes and caps table may be combined with a color, which generates another table containing tubes and caps and color entries. An entry in the table containing tube and cap and color entries is called a sample tube type entry. The sample tube type entry may also be generated by first combining a color and a cap and then link this combination to a tube entry. It is also possible to link each element of a cap, a tube, or a color table to a manufacturer, or to link a sample tube type entry to a manufacturer.

The master tube data base enables the creation of a list of sample tube types and may also comprise additional views and functionality to manage the data base, such as adding a new cap, a new tube, a new color and a new manufacturer. The data base may also include the functionality to ad attached properties. Attached properties may be provided as parameters attached to an entry of any of the tables.

For example, a cap entry in the cap table may comprise a vertical height or a diameter as an attached property. A tube entry in the tubes table may comprise an outer diameter, an inner diameter, and/or a height as an attached property.

Examples for other attached properties are uncapping profiles, recapping profiles including forces, grid positions, rotations, centrifugal parameters including empty weights, proprietary centrifuge information for loading and/or unloading, and individual information about the sample tube type, e.g. translucent cap with possible internal blood contamination influencing the cap color determination, an article number of the manufacturer, etc.

Each entry of the cap table, the color table, and the tube table may comprise additional measurement data relating and or describing specific characteristics.

A different table may be composed of a simple list of sample tube types, wherein each entry represents a combination of a tube, a cap, and a color with all its attached properties.

Figure 4:
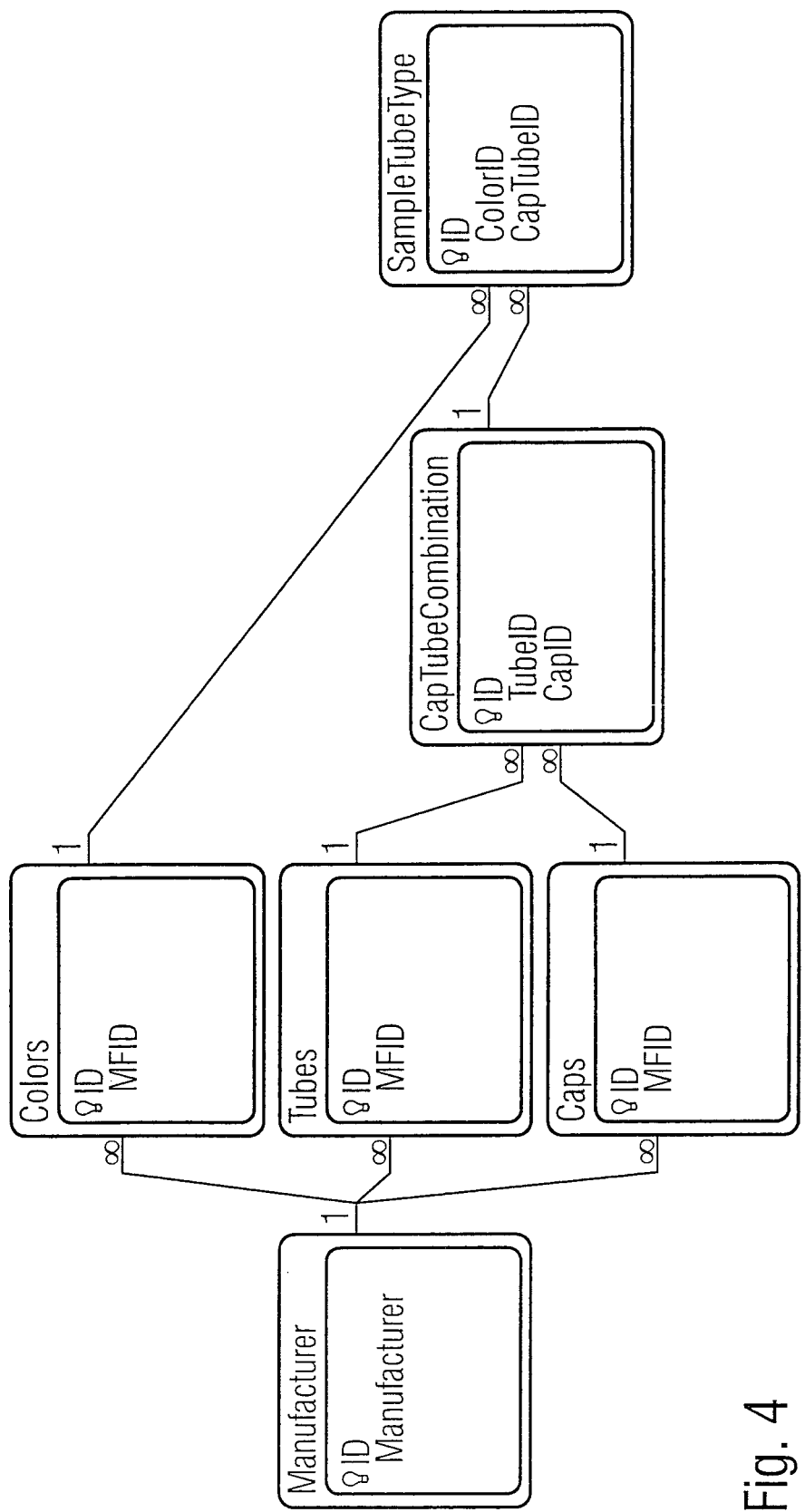
FIG. 4 is a diagram of a simple table relationship of sample tube types.

FIG. 4 shows in a diagram such a simple table relationship of sample tube types. Such a simple table relationship may be used when configuring a sample tube set for a specific laboratory automation system. Therein, each element represents an article number of the sample tube type. Sample tube type requirements may be exchanged based on article numbers and a manufacturer name. It is also possible to add hidden attached properties as metadata to leverage a search request in the MTDB for, e.g., "tall red cap tube", wherein "tall" and "red" would be metadata attached to a sample tube type or to one of its adjacent tables.

Figure 5:
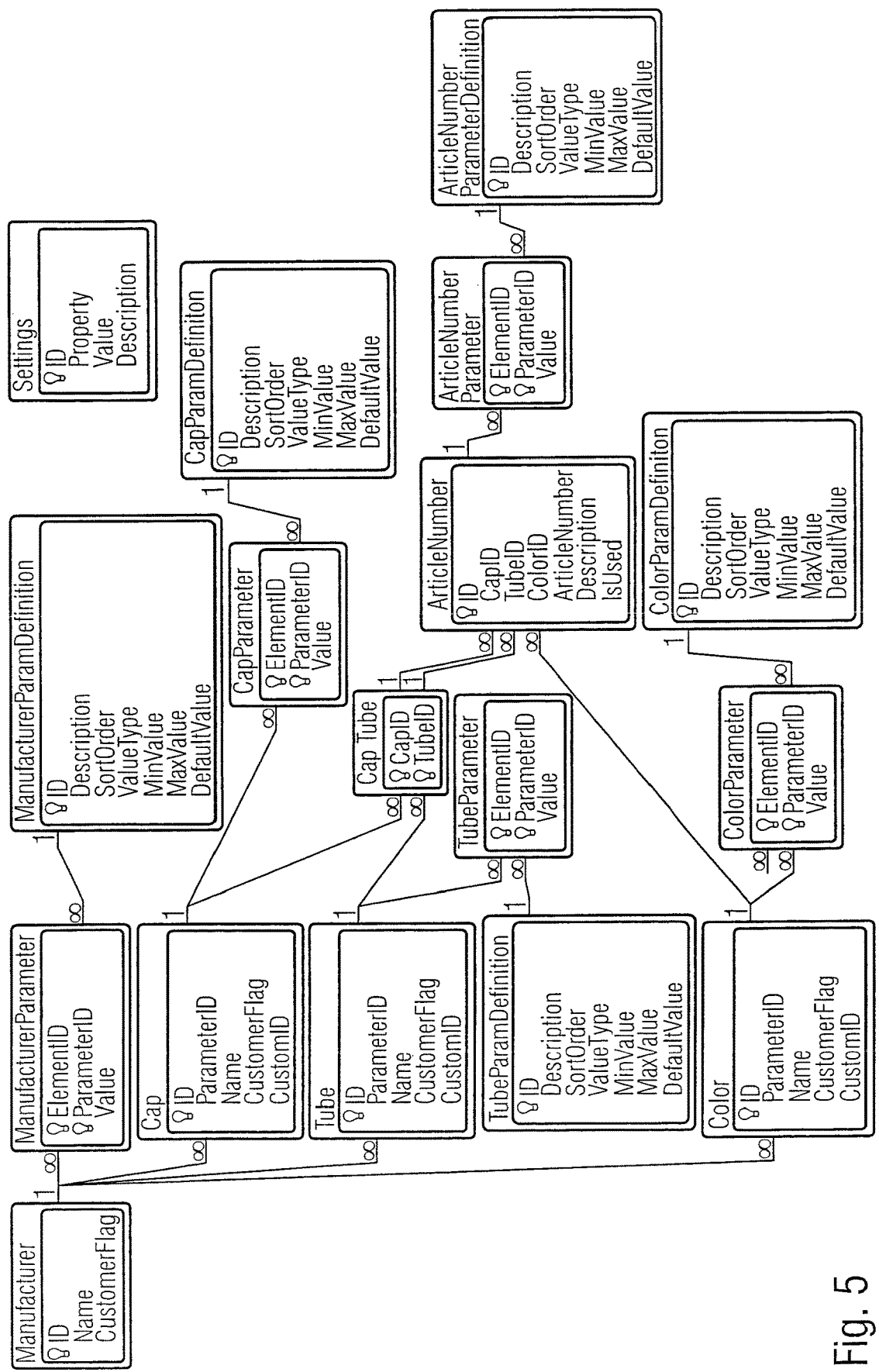
FIG. 5 is a diagram of a sophisticated table relationship of sample tube types.

FIG. 5 shows in a diagram a sophisticated table relationship of sample tube types that include further information. The more sophisticated table relationship may be stored in the MTDB.

The detection system of the LAS may identify and/or characterize the tubes of the sample tube set based on reference data which is used to classify each sample tube by calculating a distance from measured data to the reference data. If all used features are within a decision threshold, a successful classification is obtained. This corresponds to determining that the LAS is capable of correctly identifying each sample tube type of the sample tube set or a sufficient number of sample tube types.

Reference data stored in the MTDB may comprise a collection of individual measurements per sample tube type. For each main characteristic like the cap shape, the height, the cap color, reference data may be attached to the corresponding entry. A reference data for a parameter of distribution may contain a number of height measurements. The reference data for a cap may comprise a number of cap shape profiles. Color reference data may contain multiple color values. However, further reference data types may be used, e.g. the width of a tube, a tube bottom profile, data patterns from a LLD measurement system, in particular for the cap region.

For example, a system may use cap, cap shape, and colors as main characteristics, wherein the cap shape implicitly includes a width, like a diameter of the tube.

Establishing a Master Tube Data Base (MTDB)

Reference data for the MTDB may be created by a tube robot which performs pick and place operations of the LAS and is equipped with a camera. During these pick and place operations, sample tubes of different types are placed into a rack, which are then analysed in the LAS. In particular, the camera of the LAS may create image data of multiple sample tubes of the same sample tube type.

Figures 6A, 6B:
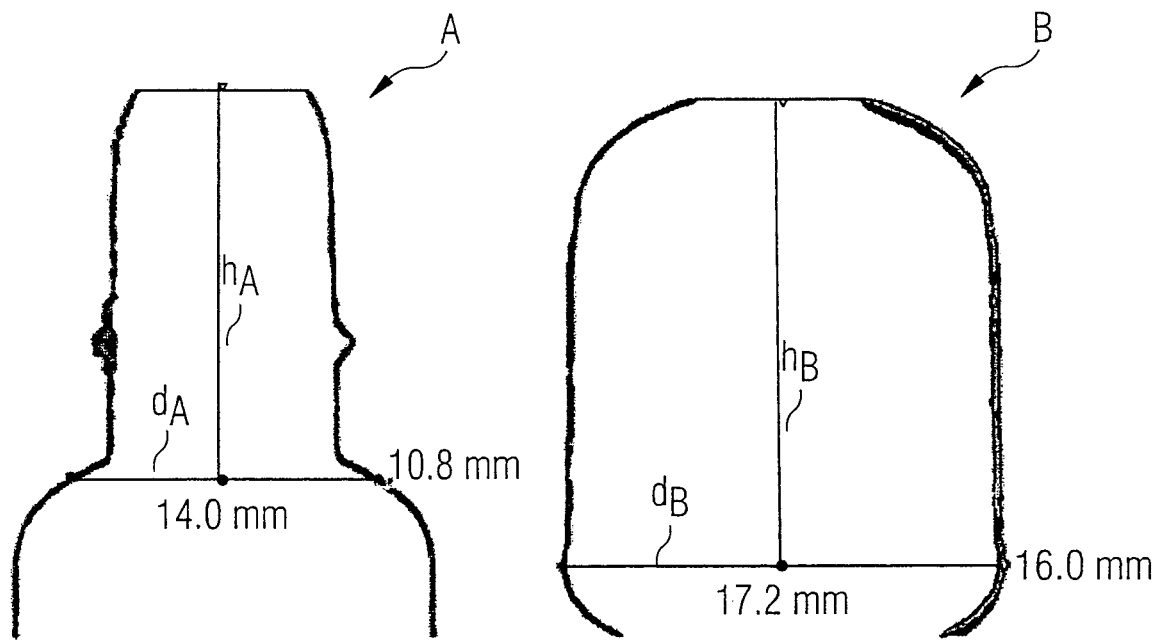
FIG. 6A is a schematic diagram of cap shape data of a first sample cap type shape.
FIG. 6B is a schematic diagram of cap shape data of a second sample cap type shape.

FIG. 6A shows in a schematic diagram cap shape data A of a first sample cap type shape. Therein, the term 'first sample cap type shape' refers to the shape of a first type of sample caps. The cap shape data A comprises overlaid images taken from a plurality of sample tube caps of the same type, namely the first sample cap type shape. The images may be taken under controlled conditions, e.g. from a side perspective at a predetermined distance and orientation. The sample caps of the first sample cap type comprise a mean height $h_A$ of 14.0 mm and a mean diameter $d_A$ of 10.8 mm. Said length and diameter may be used to specify the first sample cap type shape.

Figure 6C:
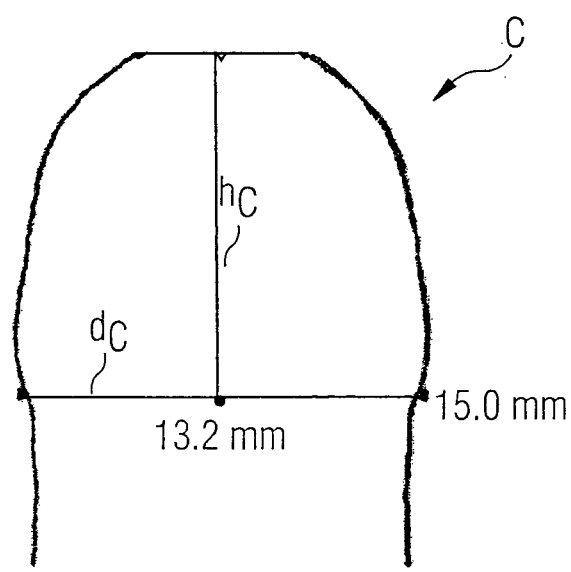
FIG. 6C is a schematic diagram of cap shape data of a third sample cap type shape.

Similarly, FIG. 6B and FIG. 6C show in a schematic diagram cap shape data B of a second sample cap type shape and cap shape data C of a third sample cap type shape, respectively. The cap shape data B and C comprise overlaid image data taken from a plurality of sample tube caps of the same type, here the second and third sample cap type. The images may be taken under controlled conditions, e.g. from a side perspective at a predetermined distance. The sample caps of the second sample cap type comprise a mean height $h_B$ of 17.2 mm and a mean diameter $d_B$ of 16.0 mm. The sample caps of the third sample cap type comprise a mean height $h_C$ of 13.2 mm and a mean diameter $d_C$ of 15.0 mm. Said heights and diameters may be used to specify the second and third sample cap type.

As shown in the FIGS. 6A, 6B, and 6C, not all specimens of the each sample cap types comprise an identical shape. Therefore, the contours of the cap shapes are slightly blurred in the cap shape data A, B, and C.

The images may be downloaded to a computer system which stores the data in a database, e.g. the MTDB. A computer program product, e.g. an application, may use the stored data to extract the features height, cap shape and colors for each recorded image. The process may be based on calibration data (a calibration image which is used to calibrate the extraction, or a calibration file that contains the calibration data) to process the images. The calibration data may be generated via the camera that recorded the sample tube type images.

With a valid calibration, the reference data may be extracted and linked to a corresponding sample tube type.

Creating the reference data may be done according to specific rules to obtain valid datasets. Preferably, the system used to record the reference data uses components that successfully passed all QC checks. The processed sample tube type include representative samples from a typical batch and/or lot. All recorded data may be checked for statistical plausibility, real outliers may not be included into the reference data.

Each data type (e.g. color, cap shape, height) may be analysed and checked as to whether it is a suitable representative. For height values, a standard deviation, an average value, a minimum value and/or a maximum value may provide a base for a safe identification decision.

For cap profiles, the stability of the cap shapes over the reference samples may, e.g., be plotted graphically to check whether the reference data is suitable.

Figure 7A:
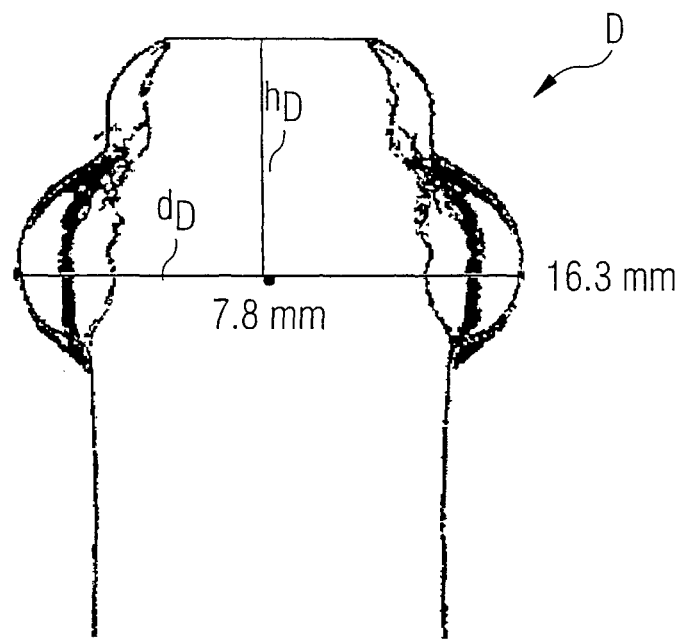
FIG. 7A is a schematic diagram of inconsistent cap shape data of a fourth sample cap type shape.

FIG. 7A shows in a schematic diagram cap shape data D of shapes of sample caps of a fourth sample cap type. The cap shape data D comprises overlaid images taken from a plurality of sample tube caps of the same type, namely the fourth sample cap type. However, as shown in FIG. 7A, the overlaid contours differ from each other strongly. Thus, in particular, the diameter do of different specimens of the same sample cap type may differ by several millimetres from each other. This may be caused by a strong impact of use and/or wear on this particular sample cap type. Thus, for the fourth sample cap type, the cap profile/shape/contour and, in particular, the diameter $d_D$ might not be stable and, thus, might not be a suitable detection parameter.

Figure 7B:
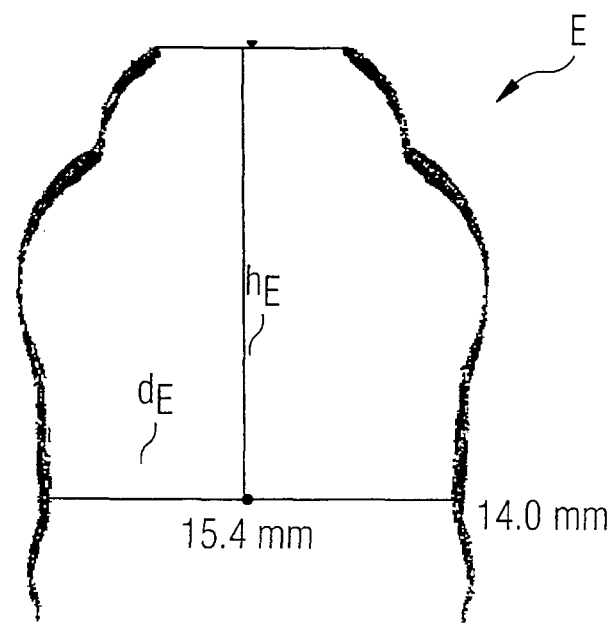
FIG. 7B is a schematic diagram of stable cap shape data of a fifth sample cap type shape.

FIG. 7B shows in a schematic diagram cap shape data E of shapes of sample caps of a fifth sample cap type. The cap shape data E comprises overlaid images taken from a plurality of sample tube caps of the same type, namely the fifth cap type. The overlaid images of the cap shape data E show a sufficient degree of stability and similarity. In particular, the images of the cap shape data E all show very similar length $l_E$ and diameters $d_E$. Thus, the cap shape data E may be suitable to be used as reference data and/or as parameter of distribution for the detection parameter "sample cap shape" for the fifth sample cap type.

For reference data relating to at least one color, it is preferred to have a performance indicator that is derived from the actual raw values, e.g., statistical data of an Euclidean distance in the used color space (RGB, HSV/HSB or other) may be used, or a max spread of the data reference.

If all criteria are met, and, e.g., a final detection test is passed successfully, the sample tube type may be approved in the MTDB.

In other words, the MTDB may be configured as a database comprising reference data and/or at least one parameter of distribution for a plurality of detection parameters of each available sample tube type, respectively. The reference data and/or the parameters of distribution may be based on reference data values of a plurality of reference measurements carried out under controlled conditions that are similar or identical to expected conditions in the instruments of the LAS. The reference data and/or the parameters of distribution may be quality controlled and reviewed for their suitability.

The MTDB may comprise tables comprising a hierarchy, and their combinations enable definition of an attached property on any level of the MTDB. The mechanism may allow setting a property on, e.g., a "tube cap" level, which would then be valid for all characteristics, e.g., colors, that are combined with the specific tube and cap. If further differentiation is required, all the attached properties may be set on sa ample tube type level, leveraging individual attached properties depending on the tube sample type.

The MTDB may, e.g., comprise a "tube" level and a corresponding tube table. Said tube table may comprise at least one of the following attached properties which may be suitable as detection parameters:
  an inner diameter of the tube;
  an outer diameter of the tube;
  a bottom offset of the tube, referring to a distance from the bottom of the tube to a height where e.g. no liquid appears;
  a height of the tube, e.g. a nominal value given by the manufacturer;
  a thread of the tube, e.g. defining whether or not the tube comprises a thread;
  a recapping profile of the tube;
  a conicity of the inner diameter of the tube; and/or
  an empty tube weight.

The MTDB may, e.g., comprise a "cap" level and a corresponding cap table. Said sample cap table may comprise at least one of the following attached properties which may be suitable as detection parameters:
  a cap height $h_t$ of the cap;
  a cap diameter d of the cap;
  a cap weight; and/or
  a uncapping profile, e.g. relating to a uncapping force and/or a grip position at the cap.

The MTDB may, e.g., comprise a "tube plus cap" level and a corresponding tube plus cap table. Said tube plus cap table may comprise at least one of the following attached properties which may be suitable as detection parameters:
  all attached properties of the tube table and the cap table;
  robot parameters for uncapping, e.g., relating to a grip position in relation to the tube bottom;
  robot parameters for recapping the tube with the cap;
  a height of the capped tube, namely the tube with the cap;
  safety parameters, e.g., a maximum fill level for safe uncapping; and/or
  a specific ID, referring to a specific ID used in an instrument of the LAS, e.g. some units, analysers, instruments may use a specific ID relating to their own definitions of a sample tube type, which is represented by a specific ID.

The MTDB may, e.g., comprise a "color" level and a corresponding color table. Said color table may comprise at least one attached property which is suitable as detection parameter. The attached properties for the "color" level are discussed below.

The MTDB may, e.g., comprise a "sample tube type" level and a corresponding sample tube type table. Said sample tube type table may comprise at least one of the following attached properties which may be suitable as detection parameters:
  a number of cap colors of the sample cap of the sample tube type that may be detected in the LAS;
  a color pattern, e.g. from a front view, a side view and/or a top view onto the sample cap and/or the sample tube type;
  a translucent cap which bears a higher risk for blood contamination from inside the cap with impact on color analysis;
  an article number and/or order number of the sample tube type;
  an additive, e.g., referring to an additive contained in the sample tube type, e.g., an expected liquid material within the sample tube type like blood, serum, urine, gel, etc.; and/or
  all attached properties from the cap table, the tube table, the tube plus cap table, and the color table may be (e.g. further) specified on sample tube type level.

Establishing a Sample Tube Set

A sample tube set, also referred to as tube configuration, for a specific LAS may be established as a subset of the MTDB. The sample tube set may be established by selecting tubes from the MTDB using a computer program product, e.g., an application, based on user requirements. The user may select a set of sample tube types that are intended to be used at the LAS, e.g. at the user's lab. The user may activate the tube configuration when finished.

The method step of adding an available sample tube type may be executed by selecting a checkbox in the application that the sample tube type shall be used in the tube configuration. This mechanism may be used when establishing a sample tube set from scratch, or for removing and adding a sample tube type from or to the sample tube set.

The sample tube set and its attached properties may be modified, e.g., due to manufacturing changes (for example, the cap color might slightly differ from lot to lot due to the cap manufacturers production process), due to a workflow change triggering a modification (e.g., an alias tube type needs to be split up due to different sorting rules), or due to fine tuning of, e.g., weight or volume calculations by correction parameters (inner diameter, conicity, offsets).

A "conflict-free" sample tube set may be a tube configuration enabling a detection software to uniquely identify and/or classify each sample tube type or alias tube type (as a collection of at least 2 sample tube types) which is comprised in the tube configuration, e.g. based on the detection parameter values of the sample/alias tube types, as measured by a specific LAS. The "conflict-free" sample tube set may satisfy routing and workflow requirements of the LAS, and, in particular, may be compatible with a workflow design of the LAS, e.g. where a correct identification of the various tube types is essential in order to correctly perform tube type dependent handling steps.

Identification conflicts may appear on several levels. 1st level conflicts may be caused by a faulty detection of a detection parameter, e.g. a height, a cap and/or bottom shape, a color, a width, etc. Two tube types of the sample tube set may be equal in all features (corresponding to detection parameters) but differ in at least one feature. Said feature may allow a decision to distinguish both sample tube types. If at least one feature exists that allows distinguishing any of two sample tube types of the sample tube set, the sample tube set may be classified as safe and/or conflict-free. In order to achieve a configuration decision, namely whether or not the tube configuration comprises a conflict or is conflict-free, each feature corresponding to a selected detection parameter of the selected sample tube types of the set may be compared to each other.

Reference data, such as height values of each sample tube type may be compared. One approach is to create statistical features of the height values for each sample tube type and compare the statistical features among the configuration. Statistical features may be, e.g., a mean value, a standard deviation, one or more peak value(s), and/or outliers.

A probability that a height value of a tube of a first sample tube type may be considered as belonging to a different second sample tube type may be calculated by assuming a normal distribution of the height values and calculating the corresponding probabilities in a PNN, which is short for "probabilistic neural network".

In a similar way, but with a 3-dimensional approach, a comparison of colors may be carried out, e.g., to extract a probability that a color detected on a tube of a first sample tube type would be considered to belong to a second sample tube type. Therein, a color distance vector and/or an Euclidean distance between coordinates of the sample and the reference values may be calculated. An equivalent approach for 2-dimensional features may be applied.

In other words, the conflict check may be implemented as a one dimensional, as a two dimensional, and/or as a three dimensional feature classification, depending on the selected detection parameters.

When checking whether or not the LAS will be able to correctly identify a cap profile and/or a bottom shape, a different approach may be applied. A cap profile may be represented by a list of horizontal distances between the left edge of the cap and the right edge of the cap, similar to the diameters $d_A$ to $d_E$ as shown in FIGS. 6A, 6B, 6C, 7A, and 7B. A table comprising cap specific data may for example comprise an two dimensional array of data points representing the outer shape of the cap, e.g. pairs of intersection points of predefined lines (which may be parallel and/or equidistant to each other), with a first edge of the cap and the opposite edge of the cap. Each pair of said intersection points may be considered to define a line.

Furthermore, each line may comprise a validity value representing a confidence level, indicating the probability of measuring said line correctly or not. The validity value of a line may lie e.g. between 0 and 1 . . . Accordingly, the validity value of 1 may refer to the highest possible confidence level, while a validity value lower than 1 may refer to a lower confidence level. The validity values may be relied upon to calculate an overall probability of the measured cap matching with reference data of a specific cap type.

In an embodiment, the following equation may be used to get a probability value P referring to a probability that a detected cap shape A belongs to the sample cap type B:

$$P = e^{\left(-\frac{\sum_{i=0}^{n}((d_{ref,i}-d_{sample,i})^2 * weight_i)}{\sigma * \sum_{i=0}^{n} weight_i}\right)};$$

Therein,
$d_{ref}$ refers to the length of a reference line
$d_{sample}$ refers to the length of a sample line;
weight is defined as $validity_{ref} * validity_{sample}$; and
σ refers to a configuration parameter for adjusting the effective selectivity between different tube types.

Furthermore, the sample line refers to the horizontal distance between a left and a right edge of the cap under inspection (in a side view of the cap shape at a specific vertical position of the cap).

The reference line refers to a sample line as part of sample data which is used as a reference.

Sample data refers to a collection of sample lines. The complete collection of sample lines may represent the cap shape of a cap under inspection.

Reference data refers to a sample data which is used as reference.

The validity values $validity_{sample}$ and $validity_{ref}$ refer to a confidence value between 0 (no validity) and 1 (full validity), which is calculated for each sample line and/or reference line. The validity value is influenced by e.g. contrast intensities for a detected edge, where a high (and therefore clear) contrast would get a high validity, and a low contrast a low validity. Other mechanisms are assigning a low validity where edges are close to other objects in the field of view (e.g. a gripper finger, the position of which is known by calibration).

A cap shape may be established by and/or may comprise an array of sample lines. The index i used in the formula may refer to a counter of the array of sample lines. The array may be arranged and/or indexed according to their respective contrast and, thus, according to their respective validity value.

Other approaches and/or mechanisms may be applied for calculating a weight value, e.g. a value representing a (e.g. vertical) gradient and/or distance of the cap profile for each line. Which approach is applied may depend on the way the probability value is used to determine the sample tube type, e.g., by nearest neighbour classification, by mean value classification, etc. A bottom shape type may also be represented by a single scalar value, which may represent the height of a best-fit triangle to the bottom area of a sample tube type. In this case, classifying may be analogous to the one dimensional height classification.

Overall Classification and Configuration Conflicts

An overall result applying the classification methods described above may provide a table containing probabilities of being a member of a selected type. Probability values and decision thresholds may be defined to estimate the probability that the LAS may correctly identify a tube of the sample tube set.

For example, the tube table may comprise the entries shown in table 1 for four different tube types:

TABLE 1

| | Height Probability decision threshold 0.3 | | | |
|---|---|---|---|---|
| | Height Class A | Height Class B | Height Class C | Height Class D |
| Sample Height | 0.9 | 0.5 | 0.1 | 0.05 |

The cap table may comprise the entries shown in table 2 for four different cap types:

TABLE 2

| | Cap Shape probability decision threshold 0.1 | | | |
|---|---|---|---|---|
| | Profile Class 1 | Profile Class 2 | Profile Class 3 | Profile Class 4 |
| Sample Cap Profile | 0.6 | 0.4 | 0.001 | 0.0001 |

The color table may comprise the entries shown in table 3 for four different color types:

TABLE 2

| | Color probability, decision threshold 0.15 | | | |
|---|---|---|---|---|
| | Class Red | Class Orange | Class Green | Class Brown |
| Sample color | 0.8 | 0.2 | 0.05 | 0.4 |

For each of the above features and/or detection parameters, an identification conflict is present depending on the applied decision threshold.

In the following explanation, an exemplary embodiment is referred to wherein the sample tube set comprises four sample tube types, namely the combinations:
Sample tube type 1: height class A, profile class 1, color class red;
Sample tube type 2: height class B, profile class 2, color class orange;
Sample tube type 3: height class C, profile class 3, color class green; and
Sample tube type 4: height class D, profile class 4, color class brown;

$1^{st}$ Level Conflict

In the exemplary embodiment, there would be a conflict for the Sample Tube Type 1 and 2, as a conflict exists on all features, here the height, the cap shape/profile, and the color. The conflict exists because the sample height, the sample cap profile, and the sample color all exceed the corresponding decision threshold, respectively.

In this embodiment, introducing a distance factor may resolve the conflicts: if a factor of 4 or more is between 2 conflicting probability values, the decision may be made even though Sample Tube Type 2 would qualify for a decision given the above thresholds. Sample tube type 1 would be the classification result.

In general, if the probability of each feature of more than one sample tube type exceeds its decision threshold, a conflict exists between those sample tube types. Additional distance factors may support resolving conflicts, but may also cause a rejection due to uncertainty. A conflict-free tube configuration may have clear decisions on all features over all Sample Tube Types of the tube configuration.

In the example above, if the Sample Tube Type 2 had a color probability higher than 0.2 and the tube required a differentiation on the laboratory level (e.g., a different workflow, different quality controls—anything that would require distinguishing Sample Tube Type 1 from Sample Tube Type 2), the situation could not be resolved by the sample tube set. This would result in an unresolvable conflict based on the Sample Tube Type detection system, in particular the LAS and the scheduled workflows.

A similar scenario exists for open tubes: as one of the criteria (cap color) is not available for open tubes, open tubes with very similar height and very similar cap shapes might not be distinguishable. Detecting this conflict might lead to deciding to not support one of the sample tube types on the LAS in the case that it would lead to a malfunction if both sample tube types were configured in the sample tube set.

For some detected conflicts, a solution may be to adjust the affected attached properties causing the conflict, or by adjusting detection parameters. Depending on the situation, adjusting Sigma ($\sigma$) in the formula above may make the tube configuration more or less tolerant. This may lead to including or excluding a sample tube type from the sample tube set, resulting in a stricter separation of two conflicting sample tube types. It is also possible to adjust individual or general decision thresholds, which can be adjusted according to a correct classification of cap shape and height to resolve the color conflict. In general, there may be a number of parameters depending on the implementation to influence the separation abilities of the LAS.

Alias ID as a Solution to $1^{st}$ Level Conflicts

Another approach to simplify the detection is using an alias tube type (also referred to as alias ID) for two sample tube types, allowing the detection system of the LAS to classify either of the conflicting classes, which would then be overruled by the alias ID. Routing rules may be adjusted to the alias. IDs.

The benefit over, e.g., merging the reference data for all features of all conflicting classes and using the merged reference data as if it was for one class, is that the reference data of the members of the alias ID would still be represented as a valid entity. In the classification process, the sample features are then not calculated against the merged reference data but against an actual original reference. If merged reference data is used, it might create another conflict with a $3^{rd}$ sample tube type, as the occupied feature space would be enlarged by combining two datasets.

$2^{nd}$ Level Conflicts

Identification conflicts may also occur on the $2^{nd}$ level in case an alias ID is used to cover several sample tube types. Another $2^{nd}$ level conflict may occur for open tubes, which may have an identical physical appearance to the detection system of the LAS once they have been uncapped.

An approach may then be to scan all sample tube types for $2^{nd}$ level conflicts, in particular for their "open tube" features, which may be subordinated to a sample tube type as a tube/cap combination, e.g. cap shape and height. If there exists a $1^{st}$ level conflict which, e.g., is resolved by implementation of an alias ID, the attached properties may be checked for $2^{nd}$ level conflicts as well. Such a conflict may appear if any of the attached properties made a significant difference in reliability, safety, accuracy or workflow if the conflicting sample tube types were handled by an alias ID.

A $2^{nd}$ level conflict of, e.g., two different allowed draw volumes and/or specified fill levels, may be resolved by choosing a value, e.g., a draw volume value and/or a fill level value, that works for all conflicting sample tube types.

Another example is a $2^{nd}$ level conflict of the inner diameters. Here, it is possible to choose an intermediate and/or mean value between the two conflicting values if the resulting inaccuracy does not cause other functional units to fail, e.g. aliquoting, weight calculation, centrifuge, etc. It is also possible to choose the parameter value based on statistical data, e.g. a most frequent value might be the best parameter value to use.

A different kind of conflict may appear when attached properties are used for other measurement systems of the LAS, e.g. for the Liquid Level Detection (LLD). In this case, flags may be used that indicate what sample content should be expected in the sample tube type, e.g. whole blood, gel, urine, serum/plasma only. The use of these content flags may enhance detection reliability and accuracy. The flags may be set to a state indicating that predetermined (e.g. two or more) sample contents are expected.

The detection algorithm applied by the LAS may make less assumptions (as input) and may be based on less information to detect the layers correctly. Such a conflict is specific to the detection system, but has to be handled by the LAS. Depending on the conflicting sample tube types, different functionalities may reduce performance. For example, a spun state detection might be impacted, volume and weight calculation, volume usage efficiency (aliquots) etc. It may depend on the configuration of the routing rules whether such conflicts really impact the performance of the LAS or not. Some LAS systems spin all tubes that come in, therefore spun state detection could be less important to such a LAS. Other LAS systems avoid extra spinning due to throughput and/or sample quality, and depend on spun state detection.

Tube Configuration Analysis

An overall analysis and/or prediction of the tube configuration for the LAS may combine all methods for feature classification and probability calculations, which provide a virtual classification of a tube set based on the reference data, and the detection of $1^{st}$ and $2^{nd}$ level conflicts. The analysis may identify all workflows that are expected to work, and may identify potential conflicts that require adaptions to be compliant to a user's expectation regarding workflow and stability. The analysis may be performed with two or more sample tube types. The analysis may be done during creation of a sample tube set or at the end of a first try. The advantage of running the analysis in parallel during creation of a sample tube set is that conflicts may become instantly visible. Furthermore provision of several warning signals may be supported, e.g. $1^{st}$ level conflict warning and $2^{nd}$ level conflict warning. If a parameter is adjusted in response to solving a $1^{st}$ or $2^{nd}$ level conflict, the analysis may be repeated to ensure the conflict was resolved accordingly.

In general, each conflict detection may be resolved by two different paths. Either the conflicting element(s) are removed from the tube configuration, or parameters are adjusted to make the tube configuration work on the LAS. Where removing the sample tube type is not an option, a resolution guide can be provided to resolve the conflict in few steps.

Figure 8:
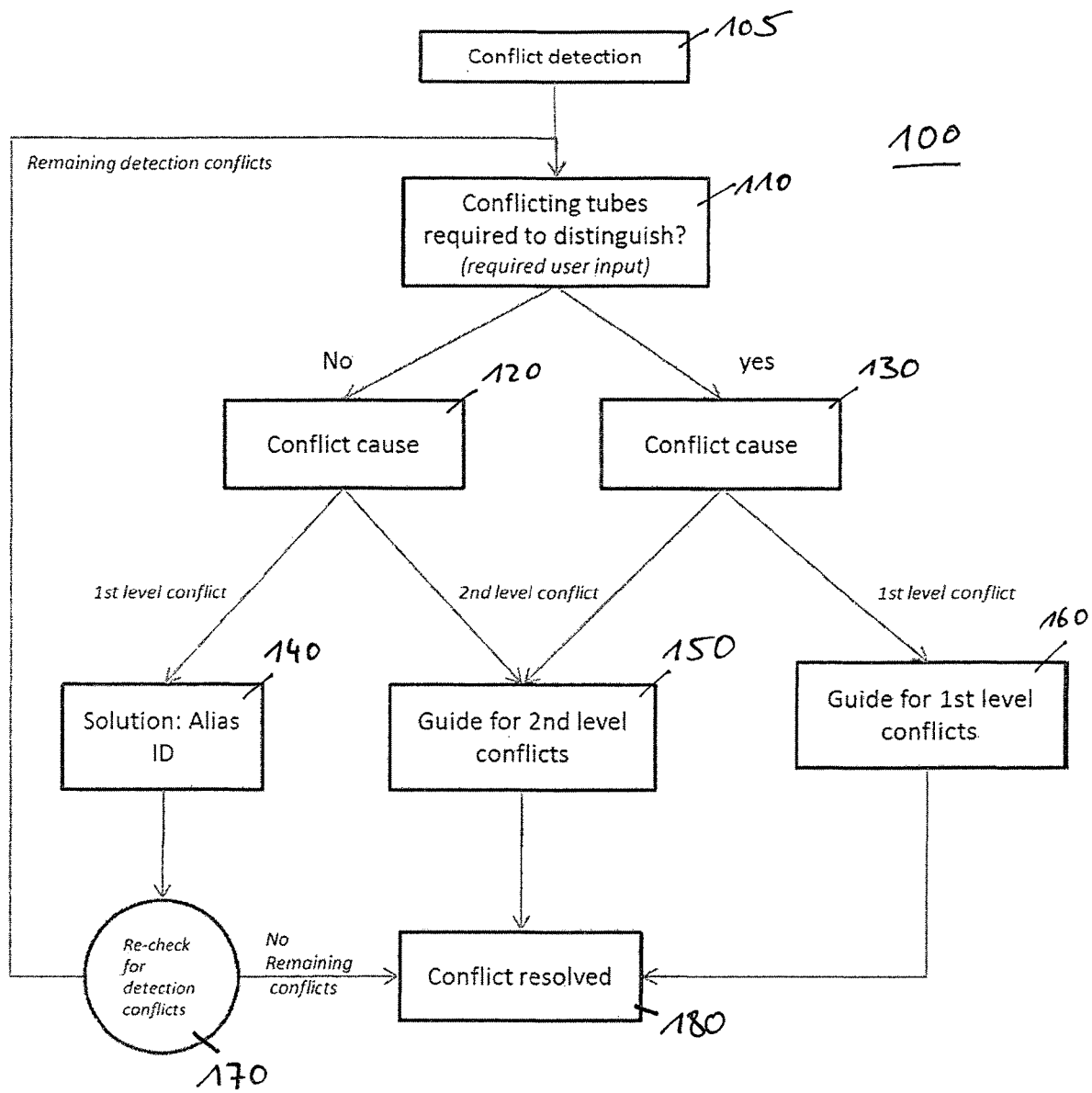
FIG. 8 is a flowchart of a conflict detection routine.

FIG. 8 shows a flowchart of such a resolution guide in form of a conflict detection routine 100.

At step 105, it is indicated that a conflict is detected. At step 110, a user is asked whether or not the conflicting tube types need to be distinguished in the LAS. Thus, an input from the user may be required whether the conflicting sample tube types need to be distinguished or not.

The next step depends on the input of the user. An alias ID may resolve a $1^{st}$ level conflict if the answer is no (step 120), but in that case, the tube configuration may still be checked for $2^{nd}$ level conflicts when the alias ID is applied. If the sample tube types needs to be distinguished (step 130), the conflict cause ($1^{st}$ or $2^{nd}$ level conflict) leads to the corresponding conflict guides.

A conflict guide for the $1^{st}$ level conflicts (step 160) is triggered in case all classification inputs as a whole lead to a classification uncertainty higher than expected. The reason behind it may be that the sample tube types are visually identical to the machine vision system and its classification mechanism. In this case, there may be no standard solution to resolve the conflict. Although the technical part could be configured to detect a difference between two sample tube types, a desired behaviour of the LAS may be to stick as closely as possible to human pattern recognition. If the technical system of the LAS makes a distinction where a lab worker is not able to, the choice of shapes and geometry of the sample tube types might not be suitable for the LAS. Therefore, an assumption may be made that a detection conflict only occurs for sample tube types that would be mistaken by humans as well, or if they are quite similar.

Due to the nature of the sample tube type landscape that is observed in labs globally, the hierarchy of the classification features may end and/or start at the top colors, which may provide a final information for a unique sample tube type. The height and the cap shape (bottom shape) are more generic characteristics, mostly coming from production tools, which commonly lead to a pre-classification or so called geometry classification. A detection conflict occurs if no feature can be used to detect a difference. In order to identify the possibilities, detailed analysis of the situation may be required. The order of the analysis may be swapped, as all potential solutions are provided.

Figure 9:
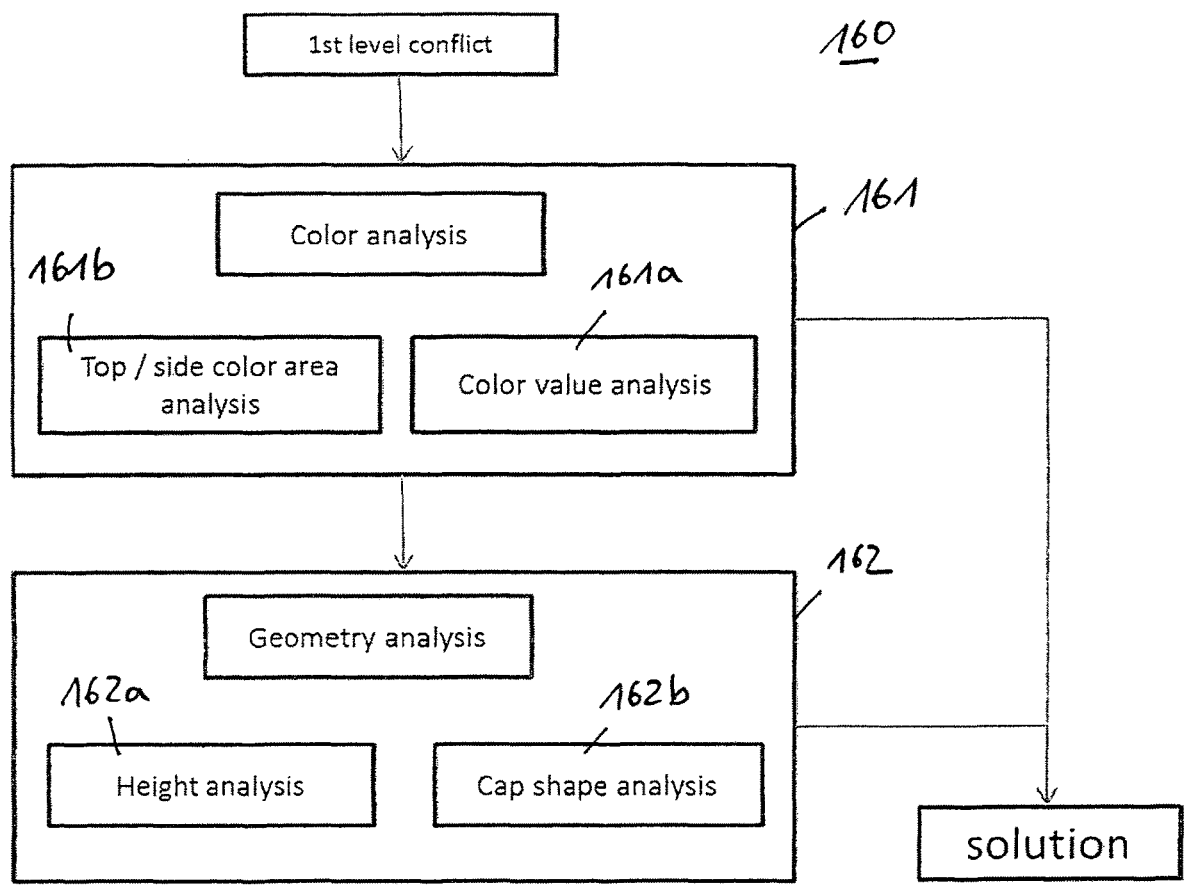
FIG. 9 is a flowchart of a $1^{st}$ level conflict solving routine.

FIG. 9 shows a flowchart of the $1^{st}$ level conflict solving routine 160 that is implemented in the routine 100 shown in FIG. 8. To solve a $1^{st}$ level conflict, a color analysis may be applied in step 161. The color analysis may comprise aspects like color value analysis, color search area(s) analysis, and top and side color analysis.

A color value analysis (step 161a) may be applied if color reference data of the conflicting sample tube types may be present with a specific overlap leading to the $1^{st}$ level conflict, or if distance factors for making a decision (e.g. decision thresholds) are not met, in particular if color reference values do not overlap, but their corresponding distance factors and/or decision thresholds overlap. There are other detection mechanisms like a color histogram correlation, which may lead to similar situations. If the situation allows it, detection parameters may be adjusted to separate the conflicting sample tube types, thus allowing an accurate classification/identification. However, if the overlap is too large, the detection parameters relating to the colors might not be adjusted, but a different approach is proposed.

A color search area(s) analysis, including a top and side color analysis, may be executed in step 161b as an alternative or in addition to the color value analysis in step 161a. Predetermined search areas, e.g. within the cap or on the top of the cap, predetermined area size(s), and/or predetermined location(s) may be used to restrict a color value and/or a color characteristic. Sample caps may comprise a proprietary (geometrical) pattern which assigns cap areas to a specific color or color combination. This information may be used to adjust the search areas, which enables a more specific color value representation and therefore a more specific classification. It is possible to add a color search area which was not included in the base configuration to distinguish between a conflict and a conflict-free tube configuration.

In case the color analysis of step 161 is not successful, a geometry analysis may be carried out in step 162. The geometry analysis 161 may include a height analysis 162a and a cap shape analysis 162b. The features height and cap shape may also be evaluated and adjusted to create a minimum overlap of the corresponding parameters of distribution. The effect of a modification of the detection parameters, e.g. the sigma value of the assumed normal distribution, are displayed in the FIGS. 10A and 10B.

Figure 10A:
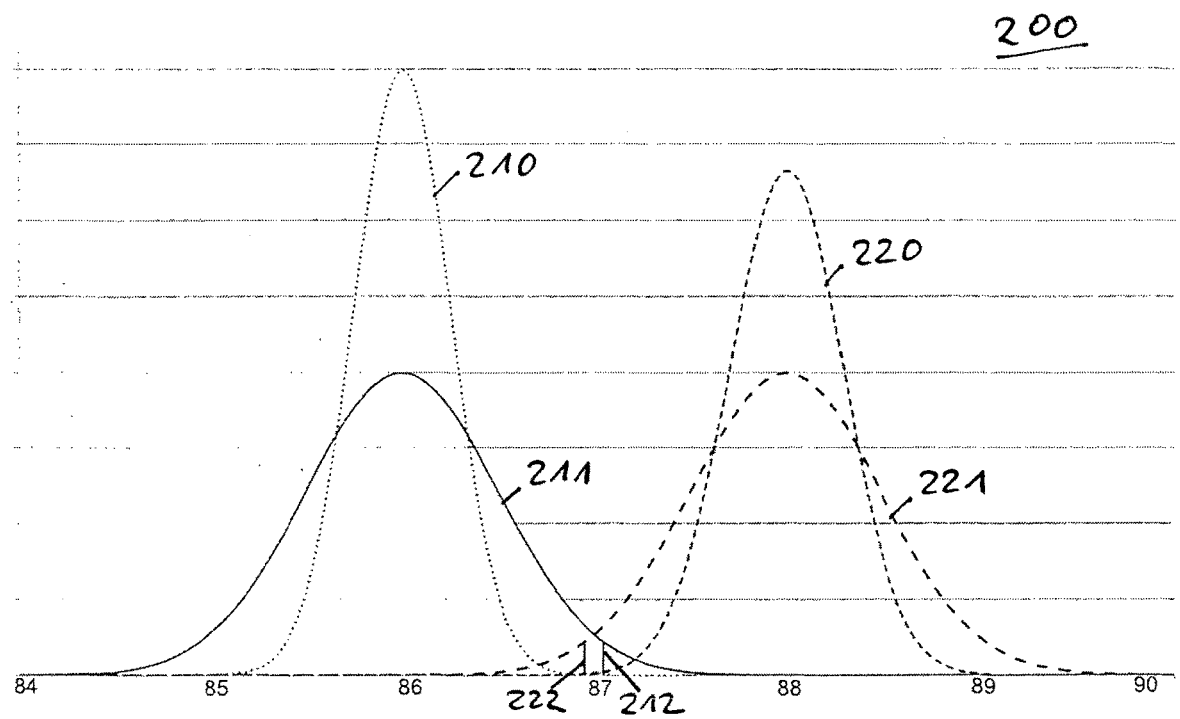
FIG. 10A is a graph of reference data of two sample tube types that cause an identification conflict.

FIG. 10A shows a graph of reference data of two sample tube types that cause a $1^{st}$ level identification conflict. An assumed distribution of a one-dimensional detection parameter like height is shown in FIG. 10A by the first assumed reference data 211 and the second assumed reference data 221. These assumed reference data 211 and 221 are based on the first real reference data 210 of a first sample tube type and the second real reference data 220 of a second sample tube type, respectively, and may be implemented as standard deviation of these real data 210 and 220.

As shown in FIG. 10A, the assumed reference data 211 and 221 of the real reference data 210 and 220 may be wider than the real reference data 210 and 220. Therefore, the curves of the assumed reference data 211 and 221 are wider than the actual variety of the specimen of the corresponding sample tube types.

A first decision threshold 212 and a second decision threshold 222 are further provided as part of the corresponding parameter of distribution. The two decision thresholds are provided given as data points representing a threshold for, e.g., evaluating a data point based on its probability value. For example, probability values greater than 10% may processed, probability values below 10% may be rejected. In FIG. 10A, the first decision threshold 212 gives a maximum value above which the first sample tube type may not be identified correctly based on the corresponding detection parameter. The second decision threshold 222 gives a minimum value below which the second sample tube type may not be identified correctly based on the corresponding detection parameter.

In other words, a decision threshold may be configured as maximum and/or minimum detection value, and may be part of a parameter of distribution corresponding to a specific detection parameter of a specific sample tube type.

The curves shown in FIG. 10A show a conflict around the X-value 87, namely in between the two decision thresholds 222 and 212.

This conflict may be resolved, e.g., by assuming a sharper distribution of one or both of the assumed reference data, or by lowering the value of the standard deviation until the two decision thresholds meet a list of criteria, or by differentiating the decision thresholds on the X-Axis, and a specific decision threshold value (e.g. an Y-value). As a result, the curves would not represent a conflict anymore.

Figure 10B:
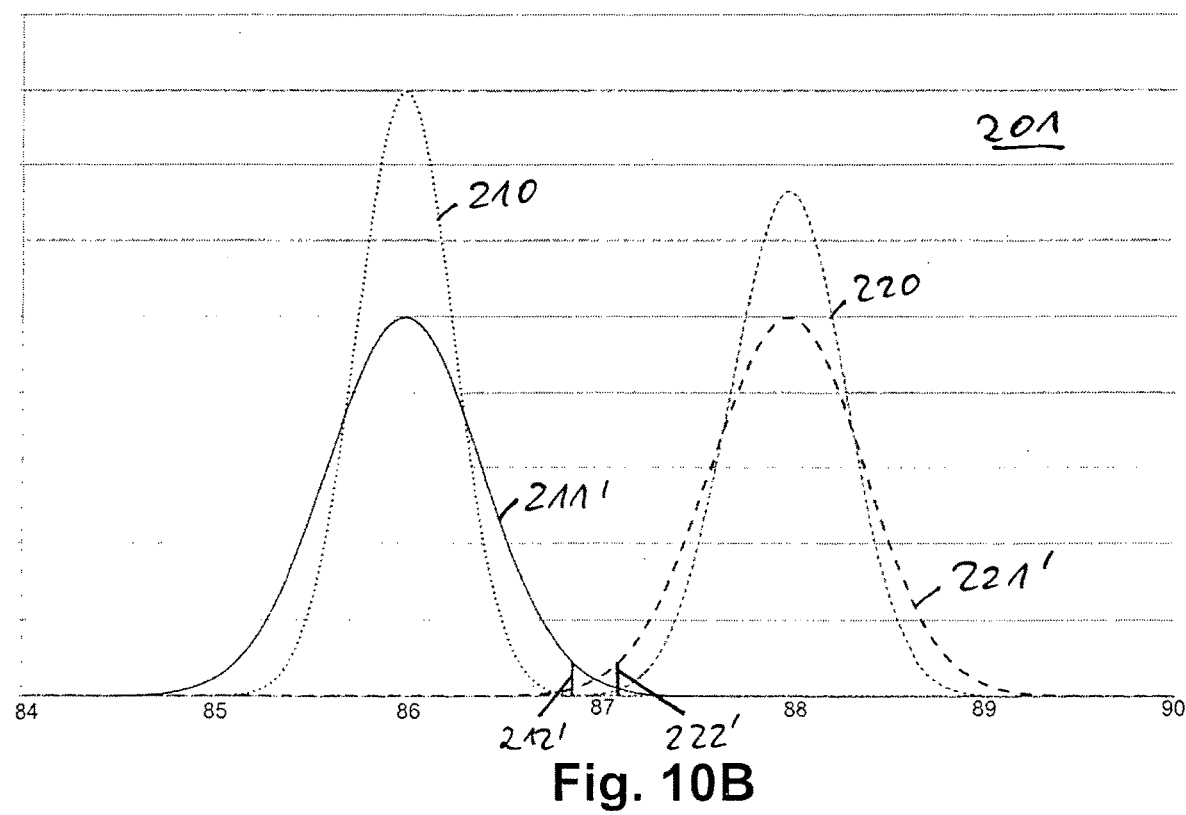
FIG. 10B is a graph of reference data of two sample tube types that cause no identification conflict.

FIG. 10B shows a graph, wherein the reference data of two sample tube types cause no identification conflict. Therein, the first assumed reference data 211 shown in FIG. 10A is adjusted into the adjusted first assumed reference data 211'. Furthermore, the second assumed reference data 221 shown in FIG. 10A is adjusted into the adjusted second assumed reference data 221'. Correspondingly, also the corresponding decision thresholds are adjusted into the adjusted first decision threshold 212' and the adjusted first decision threshold 222'. Thus, the adjusted assumed reference data 211' and 221' do not overlap over the corresponding decision thresholds 212' and 222'. Thus, when applying the adjusted assumed reference data as part of the parameter of distribution, the conflict may be resolved.

In the example shown in FIG. 10B, the decision thresholds 212' and 222' comprise a distance of 0.25 when applying a probability threshold of around 8.8%.

For other features (e.g. colors) as detection parameters, a visualization may be in a representative way, e.g. a color distance or a 3-dimensional representation. For more than two dimensions, mechanisms like nonlinear dimensionality reduction may be applied to visualize the data. It may also be possible to plot the cap shapes as raw data, or the mean value of each cap shape data point, for directly visualizing the effects of the modification of detection parameters.

The visualisation may include decision thresholds, distance factors, real reference data distribution assumptions, where the distribution assumption is based on the real data.

After running the guide 160 for $1^{st}$ level conflicts, the conflict may be resolved (step 180).

FIG. 8 also refers to a guide 150 for $2^{nd}$ level conflicts, which may be applied either when an alias ID is applied at step 120 or if a specific kind of conflict is identified in step 130 (see also above).

The guide 150 for $2^{nd}$ level conflicts is further explained in Table 4 below.

TABLE 4

| Conflicting detection parameter | Parameter unit or type | Conflict description | Solution proposals |
| --- | --- | --- | --- |
| Inner diameter Similar issue: empty tube weight, height without cap | [mm] | The inner diameters differ too much, which leads to volume and weight calculation inaccuracies. | Median value Use the value of the most frequent type Use the value which resolves the most critical aspects (depending on the tube sample types that are causing the conflicts) |
| Sample type | Urine, whole blood, serum, | The definitions influence liquid | Add expected contents, e.g. |

TABLE 4-continued

| Conflicting detection parameter | Parameter unit or type | Conflict description | Solution proposals |
|---|---|---|---|
| content definition | plasma, gel/no gel expected, all fluids/layers expected | level detection parameters (urine → liquid level detection shall not search for Gel or Cruor; whole blood → search for cruor; gel → include gel search) | urine and blood → the liquid level detection searches for all of the listed expected contents. Slight inaccuracies may occur with reduced specific information |
| Recapping | Recapping profile consisting of geometrical information and operating information (thread information, inner diameter, applied forces, timing parameters) | The inner diameters can lead to only be able to recap one of the open tubes, or to have to apply different recapping profiles. If one tube has a thread and the other one does not, a screw cap might not be applicable for both →workflow restrictions (e.g. not suitable for transport outside the lab) | In case of an inability due to geometrical restriction, recapping of the tube should not be configured Configure a profile that works for all conflict members (e.g. use the higher forces, longer push down times before releasing, or always use the recapping profile suitable for threads) |
| Height without cap | [mm] | The height of the tube with cap is identical for all conflict members. When uncapped, the height of the open tube is not equal. This influences e.g. recapping parameters and other restrictions due to height (e.g. storage). | Chose a height that works for both, similar as the approach for inner diameters. Re-inspect the tube after uncapping to obtain a proper identification. This workflow change may add cost, but resolve the conflict. In fully automated systems like Toccata, this can be configured, but the route for such a tube probably would have to be changed. |
| Uncapping | Uncapping profile: information about grip and lifting forces, grip location, thread (rotation during lifting). | e.g. a conflict between a pull cap and a screw cap, where a screw cap cannot be uncapped with the pull cap profile. grip location or force for the cap may be different causing the one of the profiles to fail (e.g. slip/drop/ lose or break the cap). | Create a new uncapping profile with suitable parameters for all conflict members (e.g. use a grip height which works for both caps) |

A final check of the method may include comparing real samples of the sample tube set visually to the set definitions.

A tube configuration check under lab requirements may be shifted to a higher level. Then, for each sample tube type, possible functional units on their routes through the LAS may be checked for parameter correctness. E.g., a sample tube type may have an analyser specific ID which is used to transfer sample tube type information to an analyser.

Once a conflict-free sample tube set is established and/or configured, remaining MTDB entries that have not been added to the tube configuration may be scanned to identify sample tube types that would cause the detection system to fail. This information may be used to check the LAS's incoming tubes with those that are intended to run on the LAS, or to identify sample tube types that would imply a specific risk.

It is also possible to check the correct rejection of sample tube types, as certain types might be suitable by physical dimensions, but not by other characteristics. In a similar way, the method may be used to create a virtually ideal sample tube set with maximized detection statistics based on a desired maximum number of different sample tube types.

The criteria would be, e.g., having no $1^{st}$ level conflicts and choosing a required distance factor between the feature probabilities to max out the safety of classification. In another scenario, the complete MTDB may be used to identify a sample tube type. Thus, a scanned sample tube may be checked against the MTDB entries, the result would be a list with the best possible matches. While this mechanism might not be usable to reliably classify a sample tube, it may output a reduced list of candidates of sample tube types, e.g., it could be used to create a tube configuration in a quick way when the sample tube types are not known by name, article number and manufacturer, or if the automatic detection is simply the faster way to create a configuration.

LIST OF REFERENCE NUMERALS 11 sample tube
12 sample tube cap
12s side of sample tube cap
20 camera
21 mirror
21' mirror
22 LLD detector
23 LLD light source
100 conflict detection routine
105, 110, 120, 130, 140, 150, 160, 170, 180 steps of the conflict detection routine
160 $1^{st}$ level conflict solving routine
200 diagram
201 diagram
210 first real reference data
211 first assumed reference data
211' adjusted first assumed reference data
212 first decision threshold
212' adjusted first decision threshold
220 second real reference data
221 second assumed reference data
221' adjusted second assumed reference data
222 second decision threshold
222' adjusted second decision threshold
$h_{tc}$ height of sample tube with cap
A first cap shape data
B second cap shape data
C third cap shape data
D fourth cap shape data E fifth cap shape data
$d_A$ diameter of first sample cap type
$d_B$ diameter of second sample cap type
$d_C$ diameter of third sample cap type
$d_D$ diameter of fourth sample cap type
$d_E$ diameter of fifth sample cap type
$h_A$ height of first sample cap type
$h_B$ height of second sample cap type
$h_C$ height of third sample cap type
$h_D$ height of fourth sample cap type
$h_E$ height of fifth sample cap type

The invention claimed is:

1. A method of establishing a tube configuration which is adapted to be processed by a laboratory automation system, the method comprising:
  selecting a tube configuration comprising several sample tube types by selecting a plurality of different sample tube types from an assortment of available sample tube types;
  obtaining a parameter of distribution for at least one detection parameter of each sample tube type comprised in said tube configuration, wherein the parameter of distribution comprises information regarding a distribution of previously detected reference data values of the at least one detection parameter;
  determining whether the laboratory automation system is capable of correctly identifying each sample tube type comprised in said tube configuration by comparing the parameter of distribution for the at least one detection parameter of each sample tube type comprised in said tube configuration with the parameter of distribution for the at least one detection parameter of all the other sample tube types comprised in said tube configuration; and
  indicating that the selected tube configuration is approved for being processed by the laboratory automation system when it is determined that the laboratory automation system is capable of correctly identifying each sample tube type comprised in said tube configuration, or proposing at least one conflict remediation when it is determined that the laboratory automation system is not capable of correctly identifying each sample tube type comprised in said tube configuration;
  wherein proposing the at least one conflict remediation comprises:
    outputting information regarding conflicting sample tube types that cause an identification conflict during the comparison, and
    determining if the conflicting sample tube types have to be distinguished by the laboratory automation system;
  wherein the method comprises, when it is determined that the conflicting sample tube types have to be distinguished, proposing as the at least one conflict remediation: to remove or replace a sample tube type from said tube configuration, and/or to adjust at least one parameter of distribution for the comparison of the parameters of distribution; and
  wherein the method comprises, when it is determined that the conflicting sample tube types do not have to be distinguished, proposing as the at least one conflict remediation to define at least two of the conflicting sample tube types as an alias tube type for said tube configuration,
  wherein the method further comprises:
    checking for potential processing conflicts of the alias tube type when the conflicting sample tube types comprised in the alias tube type are processed in the laboratory automation system, and
    resolving said processing conflicts by establishing processing parameters suitable for processing all conflicting sample tube types comprised in the alias tube type.

2. The method of claim 1, wherein said tube configuration is selected by modifying a predetermined tube configuration by removing and/or adding a sample tube type and/or an alias tube type from/to the predetermined tube configuration.

3. The method of claim 1, wherein the parameter of distribution for the at least one detection parameter of each sample tube type of said tube configuration is obtained as reference classification data from a database, wherein the reference classification data comprises information regarding a plurality of previously detected reference data values of the at least one detection parameter.

4. The method of claim 3, wherein:
  the reference classification data is obtained by detecting the at least one detection parameter in multiple reference measurements of reference sample tubes of the same sample tube configuration, and
  for the multiple reference measurements, a sensor calibration is applied that is also applicable in the laboratory automation system.

5. The method of claim 1, wherein:
  each sample tube type comprises a plurality of detection parameters, and each detection parameter is:
  a detectable property of a sample tube of the sample tube type,
  a detectable property of a sample cap of the sample tube type,
  a detectable property of a combination of a sample tube and a sample tube cap, and/or
  a detectable property related to a color of the sample tube type.

6. The method of claim 5, wherein the at least one detection parameter is selected from one of the following parameters:
  a sample tube cap dimension,
  a sample tube cap shape,
  a sample tube cap color,
  a sample tube cap color pattern,
  a sample tube dimension,
  a sample tube shape,
  an object and/or substance comprised within a sample tube,
  a number of detectable colors,
  a dimension of a combination of a sample tube and a sample tube cap,
  a shape of a combination of a sample tube and a sample tube cap,
  a color of a combination of a sample tube and a sample tube cap, and
  an object and/or substance comprised within a combination of a sample tube and a sample tube cap.

7. The method of claim 5, further comprising:
  obtaining, from a database, workflow data for each sample tube type comprised in said tube configuration, wherein:
    the workflow data is related to at least one detection parameter of each sample tube type comprised in said tube configuration, and
    the workflow data contains information regarding how each sample tube type comprised in said tube configuration is processed in at least one processing step of a workflow of the laboratory automation system; and determining, based on the obtained workflow data, whether the laboratory automation system is capable of correctly performing the at least one processing step of said workflow for each sample tube type comprised in said tube configuration.

8. The method of claim 7, wherein the at least one processing step of a workflow relates to:
detecting a tube of the sample tube type by a sensor, centrifuging a tube of the sample tube type;
gripping of a tube of the sample tube type in a pick and place operation;
uncapping and/or recapping of a tube of the sample tube type;
liquidation of sample liquid into secondary tubes;
transporting a tube of the sample tube type on a track system;
analyzing a sample contained in a tube of the sample tube type;
storing a tube of the sample tube type; and/or
removing a tube of the sample tube type from the laboratory automation system.

9. The method of claim 7, wherein the workflow data contains information regarding:
a geometry of an inner diameter of the sample tube type,
an empty tube weight of the sample tube type,
a cap weight of the sample tube type,
at least one safety parameter of the sample tube type, including a maximum filling level for safe uncapping of the sample tube type and/or a maximum acceleration speed on track of the sample tube type,
an analyzer specific tube ID of the sample tube type,
a manufacturer article and/or ordering number of the sample tube type,
a material, additive and/or feature to be expected within the sample tube type, and/or
an effective tube height, dependent on the outer tube shape and the tube placement position within the laboratory automation system.

10. The method of claim 5, wherein:
the parameter of distribution comprises information regarding a mean value, a standard deviation, a stability of shapes, and/or a maximum color value spread of the detection parameter, and/or
the comparing of the parameters of distribution comprises determining a detection parameter probability value for correctly identifying the sample tube type based on the parameter of distribution for the detection parameter.

11. The method of claim 5, wherein:
a probability is calculated that at least one sensor of the laboratory automation system can distinguish at least one detection parameter of each sample tube type from at least one detection parameter of each of the other sample tube types comprised in said tube configuration, and/or
a neural network is used to identify the sample tube types comprised in said tube configuration.

12. The method of claim 5, wherein each sample tube type comprised by the tube configuration is a kind of sample tube.

13. A non-transitory computer readable medium comprising computer-readable instructions, which, when loaded on a computer system, configure the computer system to:

select a tube configuration comprising several sample tube types by selecting a plurality of different sample tube types from an assortment of available sample tube types;

obtain a parameter of distribution for at least one detection parameter of each sample tube type comprised in said tube configuration, wherein the parameter of distribution comprises information regarding a distribution of previously detected reference data values of the at least one detection parameter;

determine whether a laboratory automation system is capable of correctly identifying each sample tube type comprised in said tube configuration by comparing the parameter of distribution for the at least one detection parameter of each sample tube type comprised in said tube configuration with the parameter of distribution for the at least one detection parameter of all the other sample tube types comprised in said tube configuration;

indicate that the selected tube configuration is approved for being processed by the laboratory automation system when it is determined that the laboratory automation system is capable of correctly identifying each sample tube type comprised in said tube configuration; and propose at least one conflict remediation when it is determined that the laboratory automation system is not capable of correctly identifying each sample tube type comprised in said tube configuration;

wherein proposing the at least one conflict remediation comprises:
outputting information regarding conflicting sample tube types that cause an identification conflict during the comparison, and
determining if the conflicting sample tube types have to be distinguished by the laboratory automation system; and wherein the instructions comprised by the medium, when loaded on the computer system, configure the computer system to:
when it is determined that the conflicting sample tube types have to be distinguished, proposing as the at least one conflict remediation: to remove or replace a sample tube type from said tube configuration, and/or to adjust at least one parameter of distribution for the comparison of the parameters of distribution; and
when it is determined that the conflicting sample tube types do not have to be distinguished:
proposing as the at least one conflict remediation to define at least two of the conflicting sample tube types as an alias tube type for said tube configuration;
checking for potential processing conflicts of the alias tube type when the conflicting sample tube types comprised in the alias tube type are processed in the laboratory automation system, and
resolving said processing conflicts by establishing processing parameters suitable for processing all conflicting sample tube types comprised in the alias tube type.

14. The non-transitory computer readable medium of claim 13, wherein each sample tube type comprised by the tube configuration is a kind of sample tube.

15. A computer for establishing a tube configuration which is adapted to be processed by a laboratory automation system, the computer programmed to perform acts comprising:

selecting a tube configuration comprising several sample tube types by selecting a plurality of different sample tube types from an assortment of available sample tube types;

obtaining a parameter of distribution for at least one detection parameter of each sample tube type comprised in said tube configuration, wherein the parameter of distribution comprises information regarding a distribution of previously detected reference data values of the detection parameter;

determining whether the laboratory automation system is capable of correctly identifying each sample tube type comprised in said tube configuration by comparing the parameter of distribution for the at least one detection parameter of each sample tube type comprised in said tube configuration with the parameter of distribution for the at least one detection parameter of all the other sample tube types comprised in said tube configuration;

indicating that the selected tube configuration is approved for being processed by the laboratory automation system when the laboratory automation system is capable of correctly identifying each sample tube type comprised in said tube configuration; and proposing at least one conflict remediation when the laboratory automation system is not capable of correctly identifying each sample tube type comprised in said tube configuration;

wherein proposing the at least one conflict remediation comprises:

outputting information regarding conflicting sample tube types that cause an identification conflict during the comparison, and determining if the conflicting sample tube types have to be distinguished by the laboratory automation system;

wherein the acts the computer is programmed to perform comprise, when it is determined that the conflicting sample tube types have to be distinguished, proposing as the at least one conflict remediation: to remove or replace a sample tube type from said tube configuration, and/or to adjust at least one parameter of distribution for the comparison of the parameters of distribution;

wherein the acts the computer is programmed to perform comprise, when it is determined that the conflicting sample tube types do not have to be distinguished:

proposing as the at least one conflict remediation to define at least two of the conflicting sample tube types as an alias tube type for said tube configuration;

checking for potential processing conflicts of the alias tube type when the conflicting sample tube types comprised in the alias tube type are processed in the laboratory automation system, and resolving said processing conflicts by establishing processing parameters suitable for processing all conflicting sample tube types comprised in the alias tube type.

16. The computer of claim 15, wherein each sample tube type comprised by the tube configuration is a kind of sample tube.

* * * * *